United States Patent
Ishida et al.

(10) Patent No.: US 9,648,198 B2
(45) Date of Patent: May 9, 2017

(54) IMAGE PROCESSING APPARATUS, IMAGE PROCESSING METHOD, AND NON-TRANSITORY COMPUTER-READABLE STORAGE MEDIUM THAT EMBED ADDITIONAL INFORMATION IN AN IMAGE HAVING A PLURALITY OF PIXELS AND IMAGE INFORMATION

(71) Applicant: CANON KABUSHIKI KAISHA, Tokyo (JP)

(72) Inventors: Yuki Ishida, Kawasaki (JP); Ryosuke Iguchi, Kawasaki (JP); Wei Song, Kawasaki (JP); Nobutaka Miyake, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/835,863

(22) Filed: Aug. 26, 2015

(65) Prior Publication Data
US 2016/0080602 A1 Mar. 17, 2016

(30) Foreign Application Priority Data
Sep. 16, 2014 (JP) ................ 2014-188252

(51) Int. Cl.
*H04N 1/32* (2006.01)
(52) U.S. Cl.
CPC ..... *H04N 1/32203* (2013.01); *H04N 1/32267* (2013.01); *H04N 2201/0082* (2013.01)

(58) Field of Classification Search
None
See application file for complete search history.

(56) References Cited

U.S. PATENT DOCUMENTS

| | | | |
|---|---|---|---|
| 6,009,213 A | 12/1999 | Miyake | |
| 7,006,668 B2 | 2/2006 | Iguchi et al. | |
| 7,103,214 B2 | 9/2006 | Kusakabe et al. | |
| 7,167,205 B2 | 1/2007 | Akiyama et al. | |
| 7,177,463 B2 | 2/2007 | Kusakabe et al. | |
| 7,408,680 B2 * | 8/2008 | Miyake | G06T 1/0028 358/3.01 |

(Continued)

FOREIGN PATENT DOCUMENTS

JP   2009-129222 A   6/2009

*Primary Examiner* — Paul F Payer
(74) *Attorney, Agent, or Firm* — Fitzpatrick, Cella, Harper & Scinto

(57) ABSTRACT

An image processing apparatus for embedding additional information in an image having a plurality of pixels and image information. A generating unit generates (a) the additional information to be embedded and (b) a bookbinding type of a medium containing the image. A holding unit holds a plurality of quantization conditions for embedding the additional information, including a quantization threshold. A selection unit segments the image into a plurality of embedding regions, and selects a condition to use in quantization based on the image information. A quantization condition control unit controls at least one of the plurality of quantization conditions for a predetermined region of the image based on the bookbinding type generated. An error diffusion processing unit distributes an error to peripheral pixels of a target pixel. A separating unit separates the embedded additional information from the image.

20 Claims, 28 Drawing Sheets

(56) References Cited

U.S. PATENT DOCUMENTS

| | | |
|---|---|---|
| 7,433,538 B2 | 10/2008 | Kusakabe et al. |
| 7,634,153 B2 | 12/2009 | Miyake et al. |
| 7,738,030 B2 | 6/2010 | Akiyama et al. |
| 8,023,764 B2 | 9/2011 | Miyake et al. |
| 8,300,925 B2 * | 10/2012 | Kunieda ............... G06T 1/0028 345/419 |
| 8,306,357 B2 | 11/2012 | Miyake et al. |
| 8,600,154 B2 | 12/2013 | Umeda et al. |
| 8,675,249 B2 | 3/2014 | Umeda et al. |
| 8,744,209 B2 | 6/2014 | Miyake et al. |
| 8,929,681 B2 | 1/2015 | Umeda et al. |
| 9,036,205 B2 | 5/2015 | Umeda et al. |
| 9,088,753 B2 | 7/2015 | Akiba et al. |

\* cited by examiner

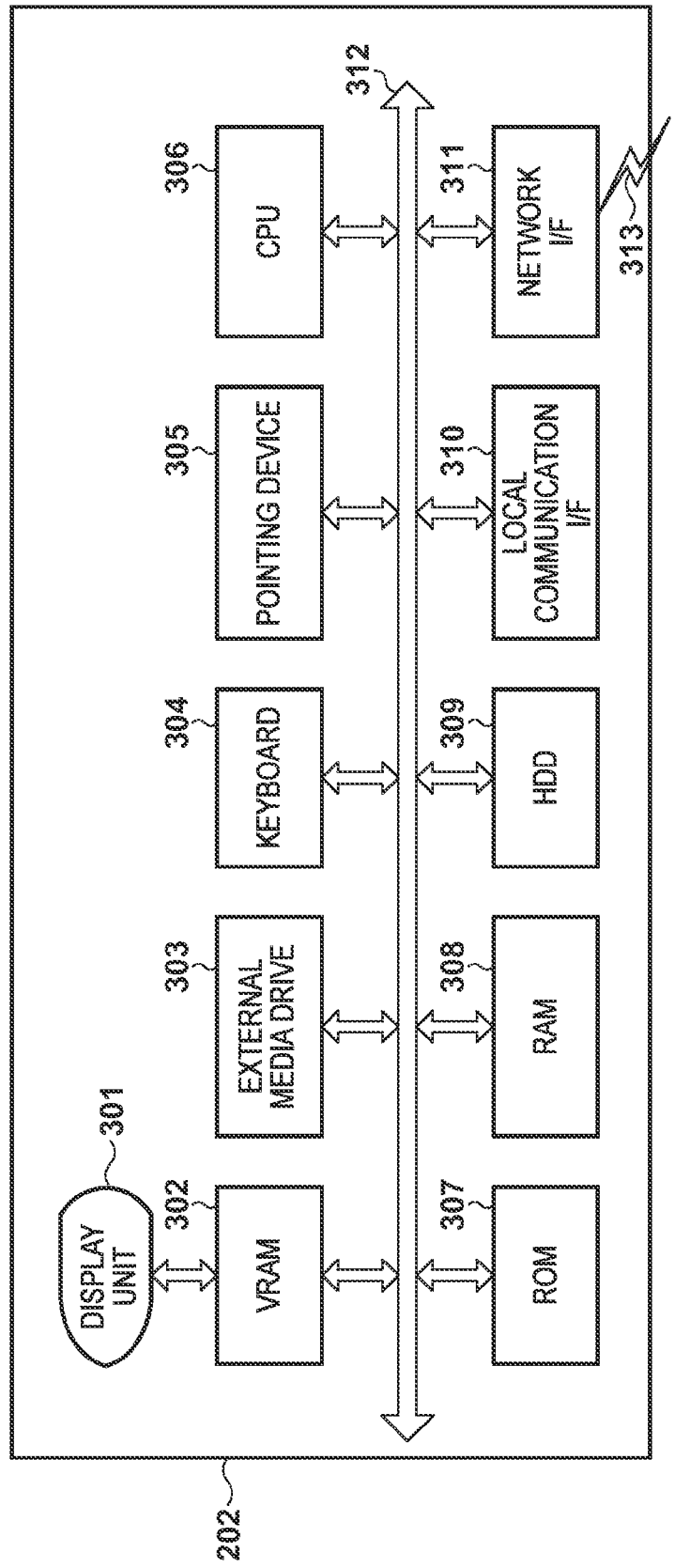

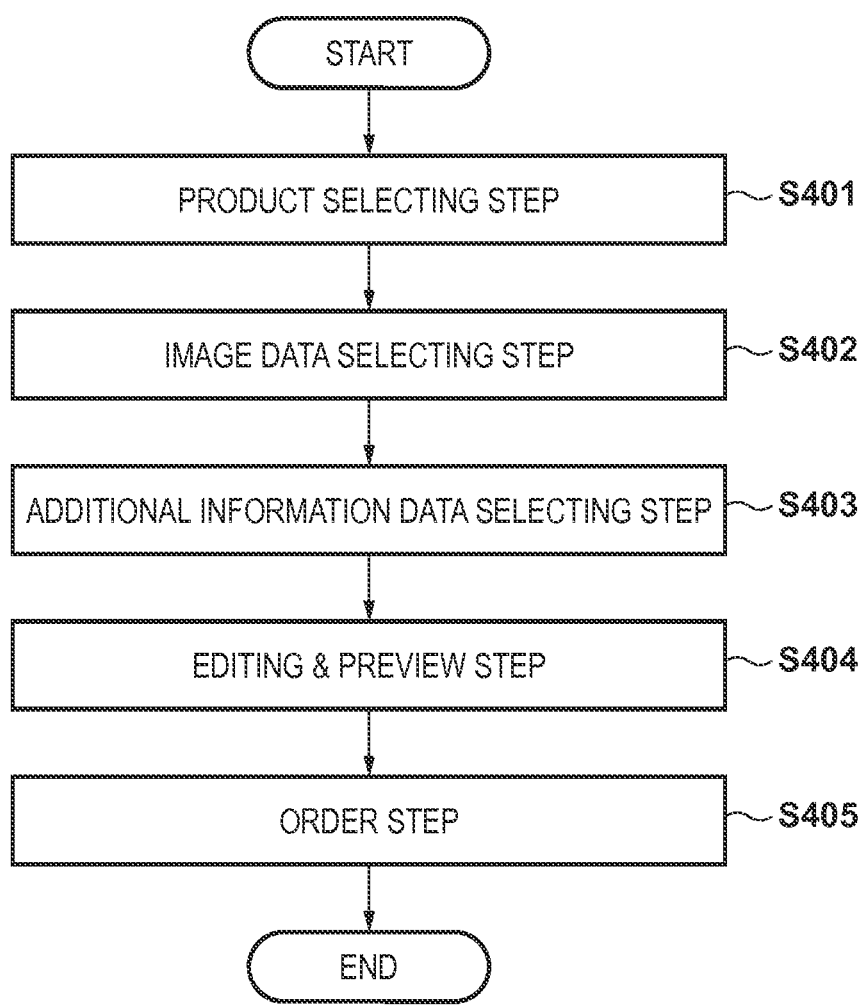

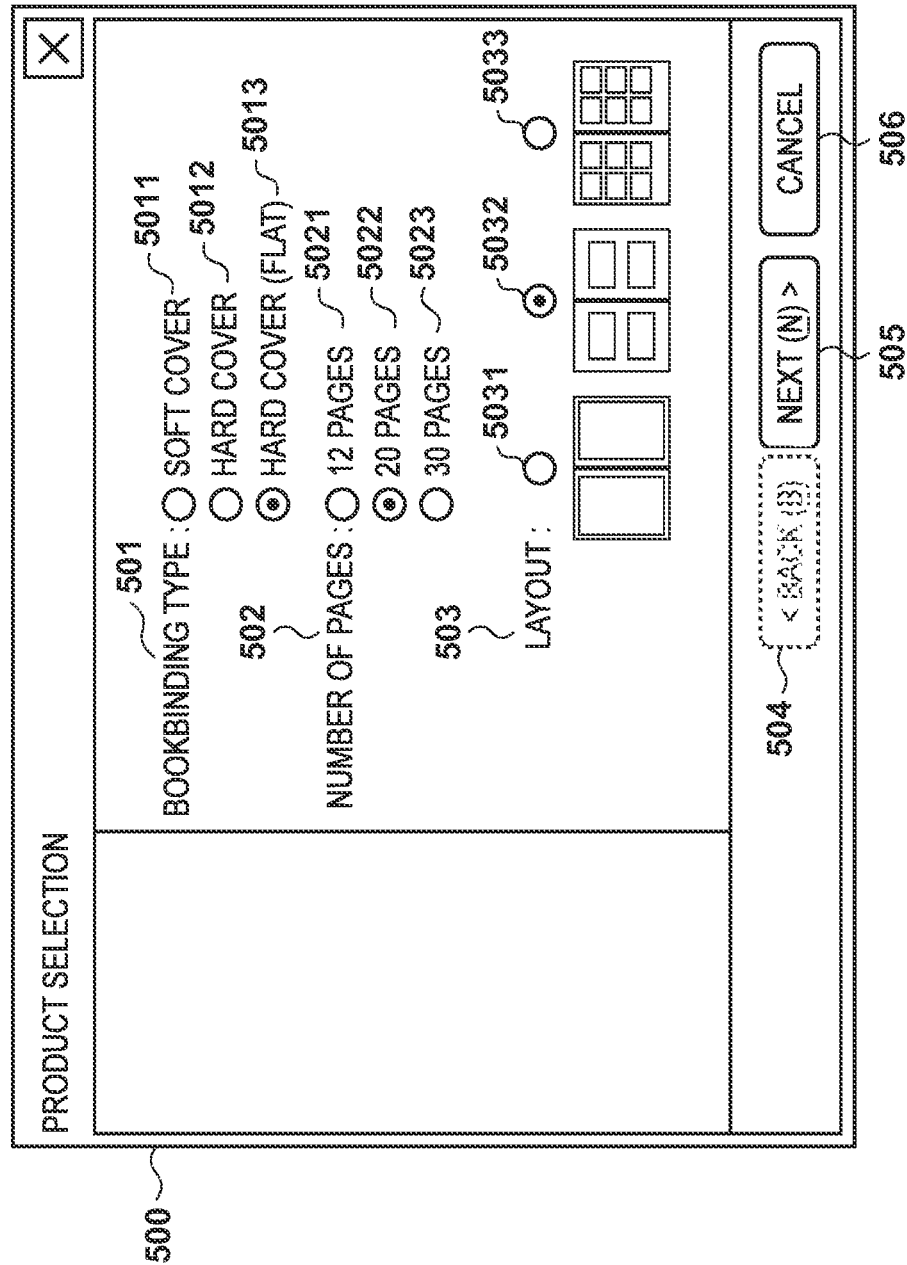

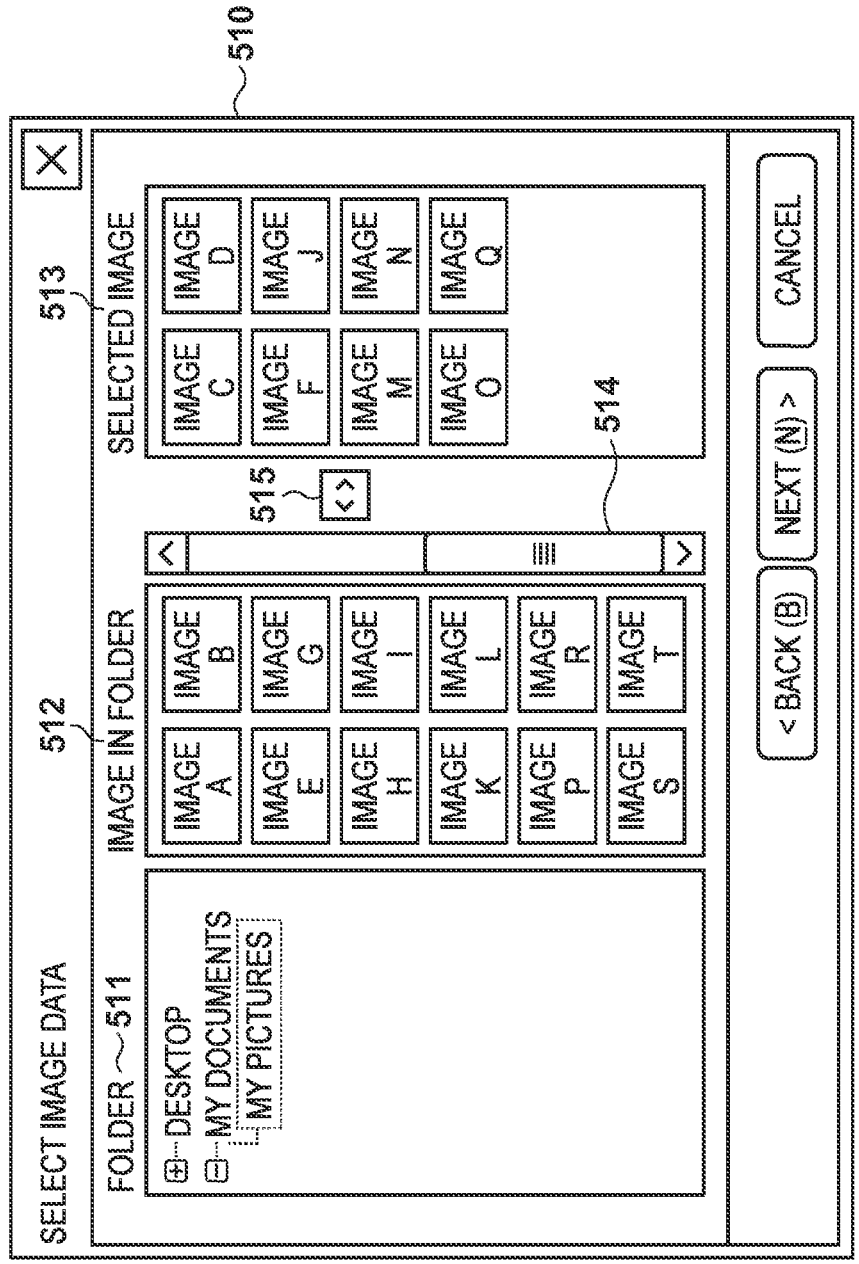

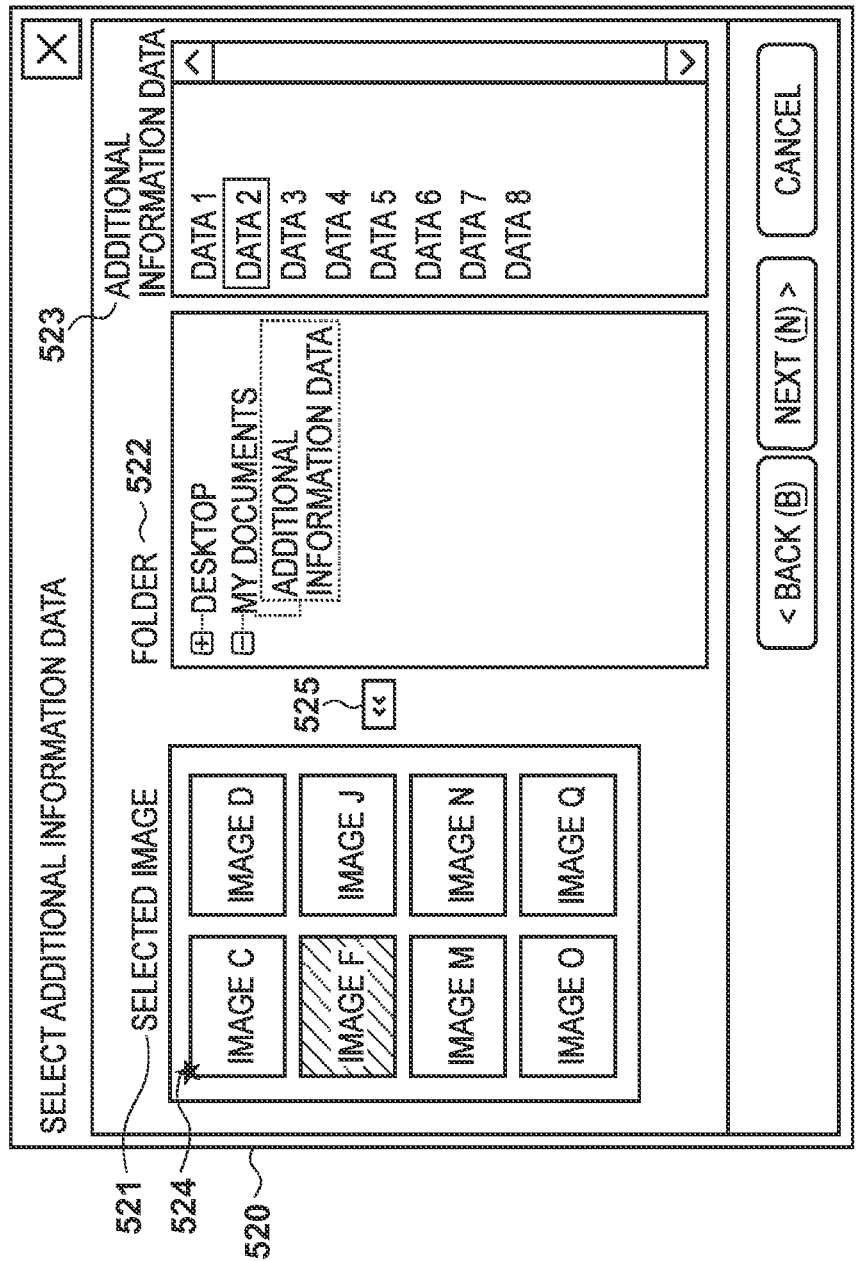

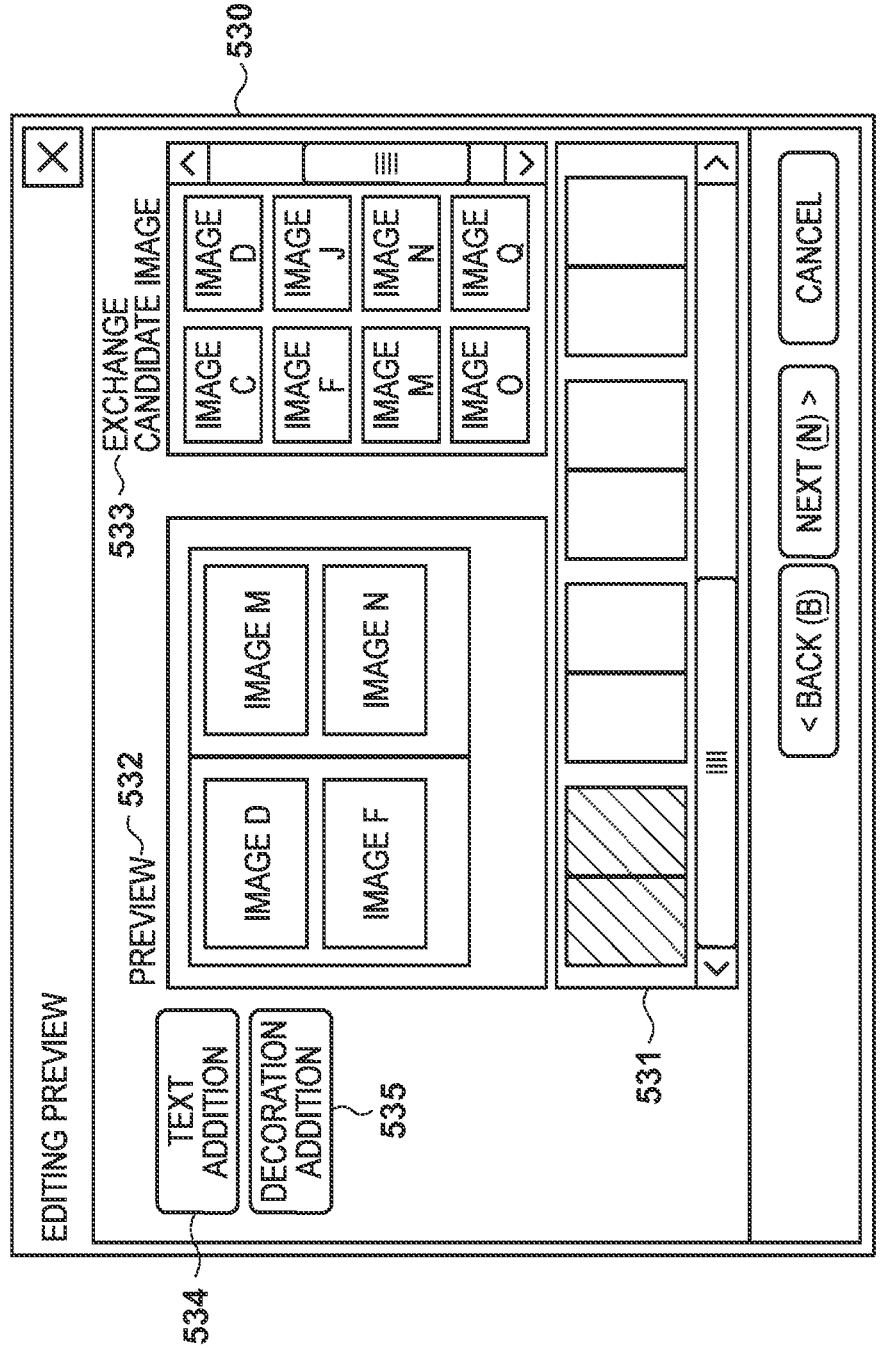

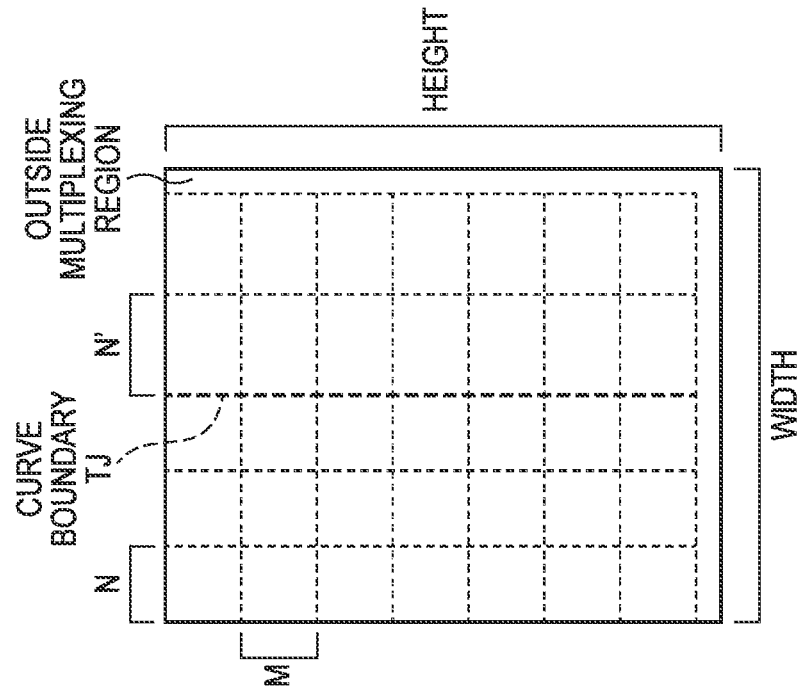
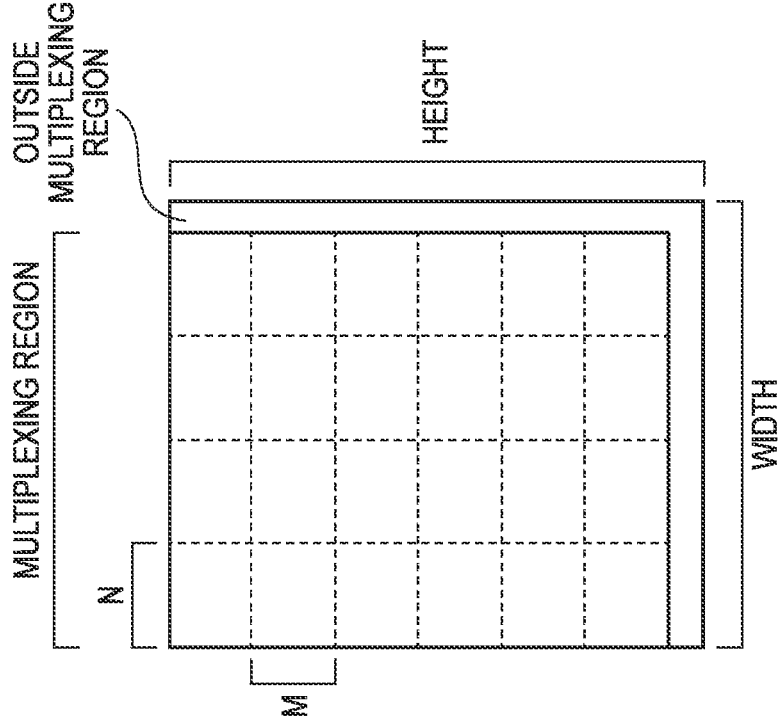

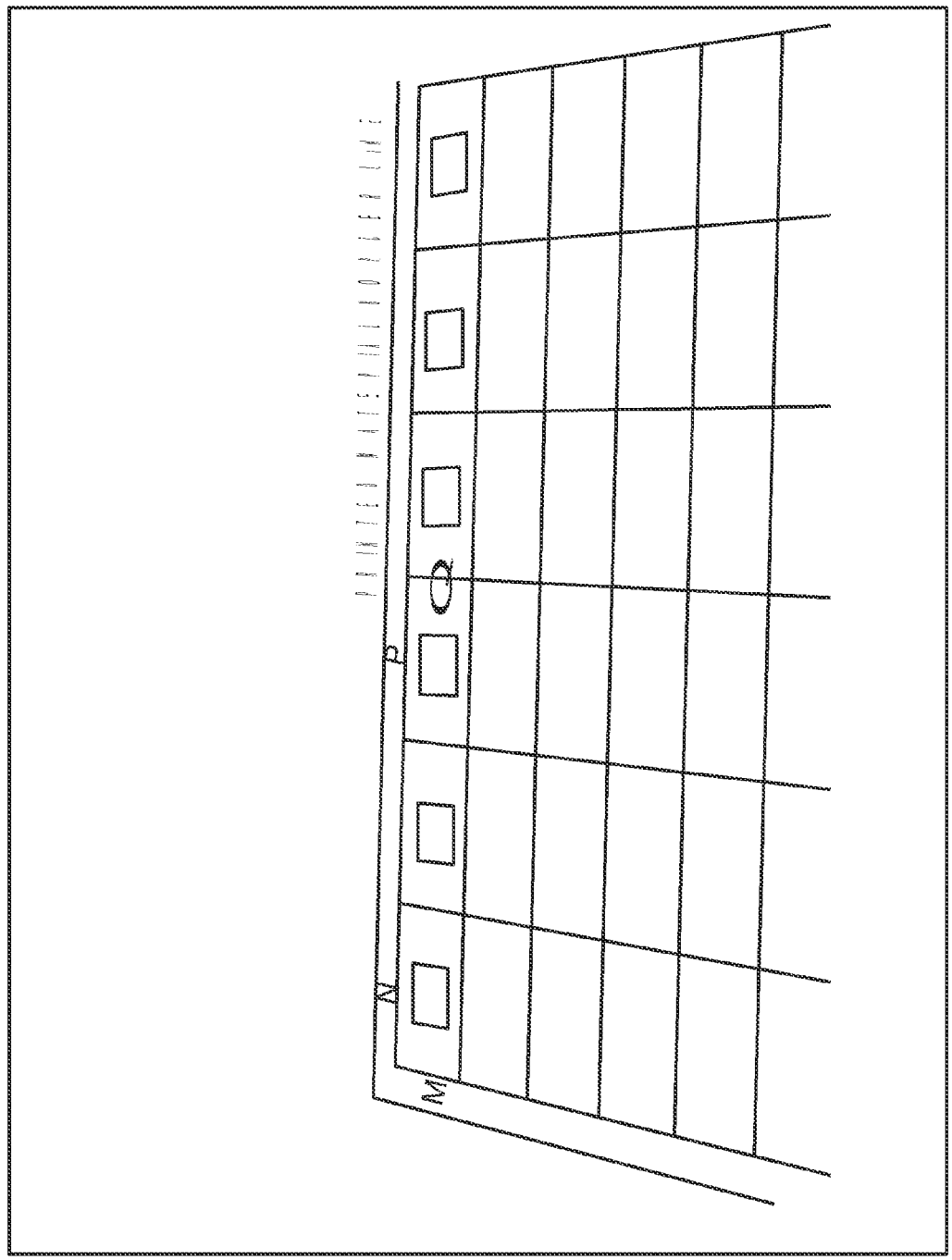
F I G. 12B

FIG. 13A

|  |  |  | -1 | -1 |
|---|---|---|---|---|
|  | -1 | -1 | 2 | 2 |
| -1 | 2 | 2 | -1 | -1 |
| 2 | -1 | -1 |  |  |
| -1 |  |  |  |  |

FIG. 13B

| -1 | 2 | -1 |  |  |
|---|---|---|---|---|
| -1 | 2 | -1 |  |  |
|  | -1 | 2 | -1 |  |
|  | -1 | 2 | -1 |  |
|  |  | -1 | 2 | -1 |

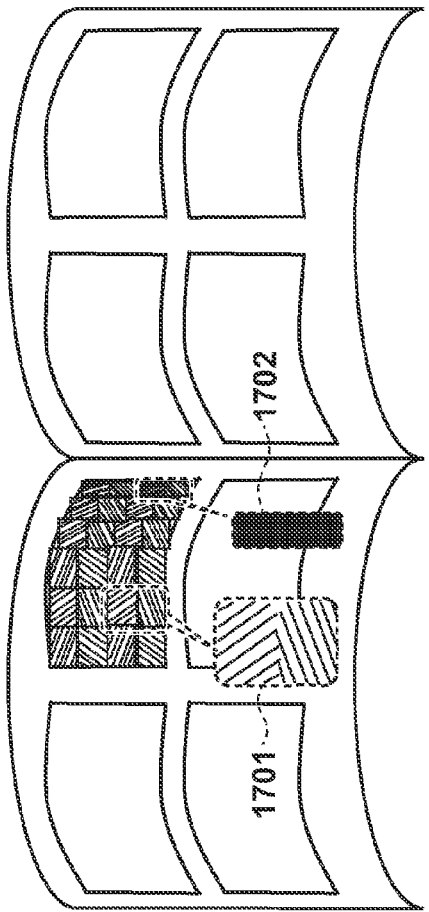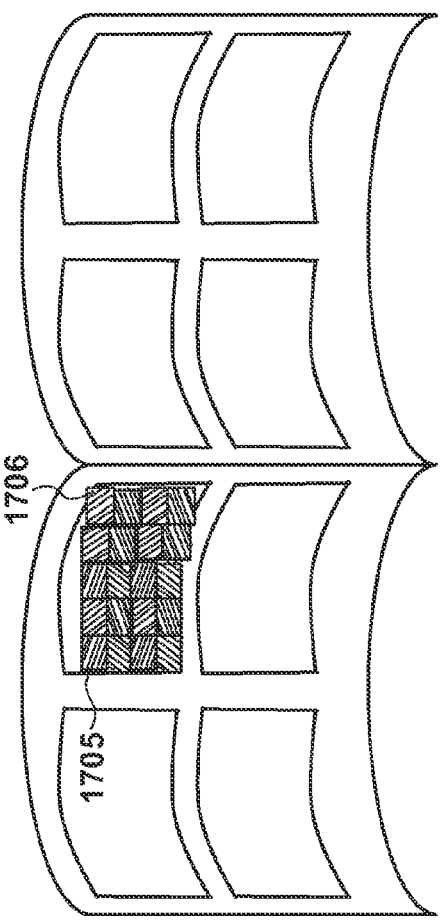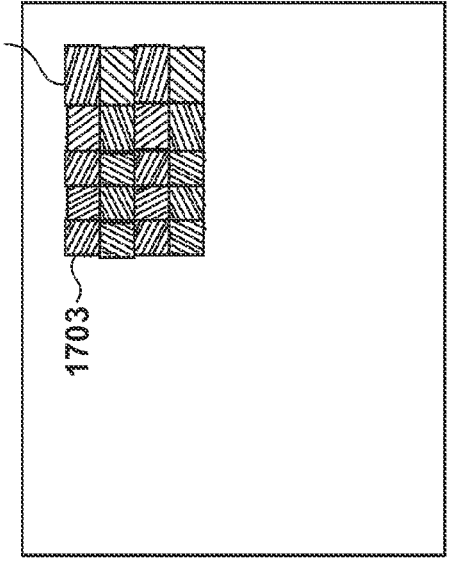

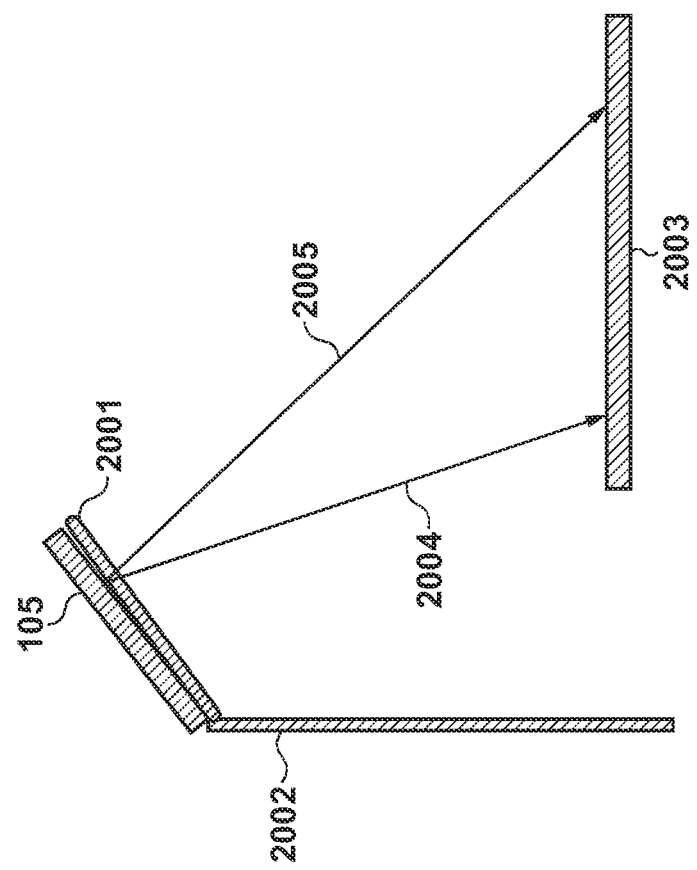
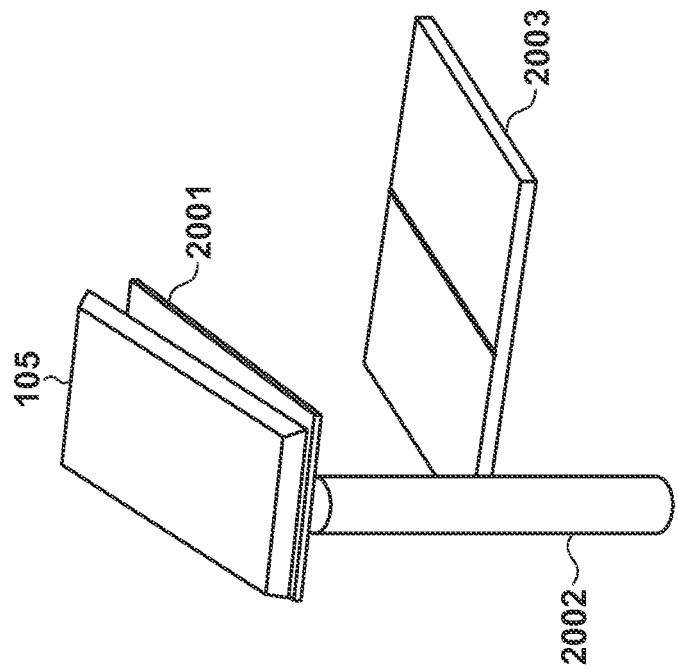
FIG. 20A
FIG. 20B

IMAGE PROCESSING APPARATUS, IMAGE PROCESSING METHOD, AND NON-TRANSITORY COMPUTER-READABLE STORAGE MEDIUM THAT EMBED ADDITIONAL INFORMATION IN AN IMAGE HAVING A PLURALITY OF PIXELS AND IMAGE INFORMATION

CLAIM OF PRIORITY

This application claims the benefit of Japanese Patent Application No. 2014-188252, filed Sep. 16, 2014, which is hereby incorporated by reference herein in its entirety.

BACKGROUND OF THE INVENTION

Field of the Invention

The present invention relates to an image processing technique for embedding additional information in an image.

Description of the Related Art

In recent years, a technique (referred to as a digital watermark technique) of multiplexing additional information, such as an author name or the existence or absence of usage permission, in image information, such as a photograph, picture, or the like, in a way that is hard to distinguish the additional information visually, has been standardized. As another application field, in conjunction with improvements in image quality of image outputting apparatuses, such as a copying machine or a printer, and with the objective of preventing improper forgery of banknotes, stamps, securities, or the like, there is a technique of embedding additional information, in an image output to paper, to specify an output device and a body number therefor from the image.

Meanwhile, photo books created by laying-out digital photographs in a page and book-binding a plurality of pages have spread. For example, when a bookbinding method, in which a gutter portion becomes flat when the photo book is opened, is selected, a flexible back 101 (or hollow back) is used as a type of back for the bookbinding, as shown on FIG. 1A. For the photo book created with this bookbinding method, because a portion for the back of the photo book is made from a soft material, it is possible to open the pages to a full double-page spread, and a gutter portion 103 becomes flat when the photo book is opened. Meanwhile, if a more common bookbinding method is selected, a tight back 102, as shown in FIG. 1B, is used. For a photo book created with this bookbinding method, because the back portion of the photo book is made from a hard material, how the pages open is restricted, and a valley fold is formed in the gutter portion 103 when the photo book is opened.

There is a method that uses an image capturing device (hereafter, a camera) as a method of reading additional information printed when a photo book, in which additional information is embedded in a photograph used in the photo book, by using the digital watermark technique, is created. When using a bookbinding method for which the gutter portion 103 becomes flat without forming a valley fold, as with the flexible back 101, it is possible to read the additional information from an image captured by the camera. However, when a bookbinding method for which a valley fold is formed in the gutter portion 103, as in the tight back 102, is used, a capturing angle for an imaged surface of the photo book in relation to the imaging direction of the camera becomes non-perpendicular with respect to the camera as the gutter portion 103 is approached. A common digital watermark technique is to multiplex information by embedding additional information having a high-frequency component into an image, and combining specific patterns thereof. If additional information embedded in a photograph is imaged in a state in which the capturing angle is not perpendicular, the high-frequency component of the additional information becomes an even higher frequency, and it becomes harder to read the additional information. Japanese Patent Laid-Open No. 2009-129222 discloses a method of reading a two-dimensional code for which curve distortion is large.

Japanese Patent Laid-Open No. 2009-129222 determines the existence/absence of curve distortion due to whether a line connecting at least three function cells arranged on a straight line in a two-dimensional code is within a predetermined range of a straight line, and decoding the two-dimensional code (correcting the image) in accordance with a result of the determining.

However, in the case of controlling reading of additional information by determining this kind of image distortion, there are still problems as follows.

In other words, as shown in FIG. 1C, for example, if a capturing angle between an imaging direction 106 for a camera-equipped mobile terminal 105 and an imaged surface 107 is restrained within a predetermined range with respect to what is perpendicular, it is possible to correct the captured image. In contrast to this, as with the relation between the imaging direction 106 and an imaged surface 108, if the capturing angle exceeds a predetermined range, an image of the imaged surface 108 becomes completely unreadable, so that it is not possible to correct the captured image, and as a result, it is not possible to read the additional information. Here, to return the capturing angle between the imaging direction 106 and the imaged surface 108 to what is perpendicular, it is possible to push open the gutter portion 103, but there is a possibility of destroying the photo book by strongly pushing it open.

SUMMARY OF THE INVENTION

The present invention is conceived to solve the above problems, and provides a technique by which it is possible to read, with good precision, additional information included in an image, irrespective of a capturing angle with respect to an image capture apparatus.

According to a first aspect, the present invention provides an image processing apparatus for embedding additional information in an image, comprising a holding unit that holds a plurality of quantization conditions for embedding the additional information, and a selection unit that segments the image into a plurality of embedding regions, and selects a condition to use in quantization from the plurality of quantization conditions based on information of the image that corresponds to an embedding region to be processed and a position of the embedding region to be processed.

According to a second aspect, the present invention provides an image processing apparatus for embedding additional information in an image, comprising a holding unit that holds a plurality of multiplexing periods for embedding the additional information, and a selection unit that segments the image into a plurality of embedding regions, and selects a multiplexing period to be multiplexed to the image from the plurality of multiplexing periods, based on information of the image that corresponds to an embedding region to be processed and a position of the embedding region to be processed.

According to a third aspect, the present invention provides an image processing method for embedding additional information in an image, comprising holding a plurality of quantization conditions for embedding the additional information; and segmenting the image into a plurality of embedding regions, and selecting a condition to use in quantization from the plurality of quantization conditions based on information of the image that corresponds to an embedding region to be processed and a position of the embedding region to be processed.

According to a fourth aspect, the present invention provides an image processing method for embedding additional information in an image, comprising holding a plurality of multiplexing periods for embedding the additional information, and segmenting the image into a plurality of embedding regions, and selecting a multiplexing period to be multiplexed to the image from the plurality of multiplexing periods, based on information of the image that corresponds to an embedding region to be processed and a position of the embedding region to be processed.

According to a fifth aspect, the present invention provides a non-transitory computer-readable storage medium storing a program for causing a computer to perform image processing to embed additional information in an image, wherein the computer program causes the computer, which holds a plurality of quantization conditions for embedding the additional information, to function as a selection unit that segments the image into a plurality of embedding regions, and selects a condition to use in quantization from the plurality of quantization conditions based on information of the image that corresponds to an embedding region to be processed and a position of the embedding region to be processed.

According to a sixth aspect, the present invention provides a non-transitory computer-readable storage medium storing a program for causing a computer to perform image processing to embed additional information in an image, wherein the computer program causes the computer, which holds a plurality of multiplexing periods for embedding the additional information, to function as a selection unit that segments the image into a plurality of embedding regions, and selects a multiplexing period to be multiplexed to the image from the plurality of multiplexing periods, based on information of the image that corresponds to an embedding region to be processed and a position of the embedding region to be processed.

Further features of the present invention will become apparent from the following description of exemplary embodiments (with reference to the attached drawings).

BRIEF DESCRIPTION OF THE DRAWINGS

FIGS. 3A and 3B are block diagrams for illustrating a hardware configuration and a functional configuration of a generating apparatus.

FIG. 4 is a flowchart for illustrating processing executed by the generating apparatus.

FIGS. 5A to 5D are views for illustrating a user interface for the generating apparatus.

FIGS. 9A and 9B are views for illustrating an example of a multiplexing region.

FIGS. 12A and 12B are views for illustrating an example of a captured image.

FIGS. 13A and 13B are views for illustrating a spatial filter for the separating apparatus.

FIGS. 16A and 16B are views for explaining a method for thinning pixels.

FIGS. 17A to 17D are views for illustrating an example of a bound photo book.

FIGS. 20A and 20B are views for illustrating examples of reading additional information.

DESCRIPTION OF THE EMBODIMENTS

Note that, for an image processing apparatus in the following embodiments, there is a generating apparatus that generates photo book information, a multiplexing apparatus that embeds additional information in printed material, or a separating apparatus that reads the additional information from the printed material. The multiplexing apparatus and the generating apparatus may be realized as a printer driver or application software in a computer, but may also be realized as hardware and software in an image forming apparatus such as a copying machine, facsimile, or a printer main body. A separating apparatus may be a device provided with an image capture apparatus, such as a camera-equipped mobile terminal, a camera-equipped smartphone, or a tablet PC. Alternatively, the separating apparatus may be a sequence of apparatuses that separates additional information from an image captured by a digital still camera by application software in a computer. The computer is not limited to a desktop type device, but may be any device in which software is operable, such as a notebook PC, smart phone, or tablet PC.

First Embodiment

Generating Apparatus

Figure 2:
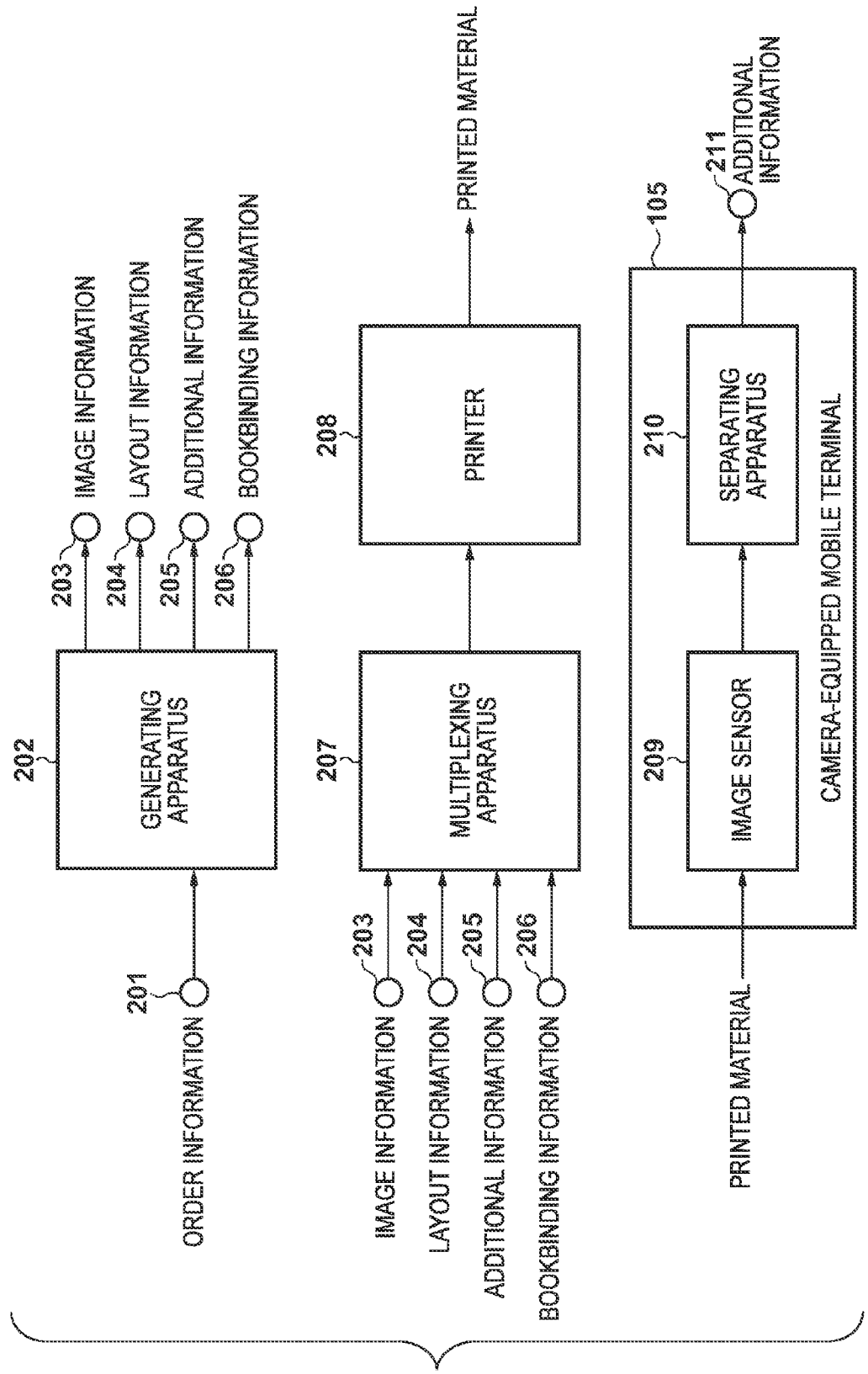
FIG. 2 is a block diagram for illustrating a configuration of an image processing system.

FIG. 2 is a block diagram for illustrating a configuration of an image processing system.

Reference numeral 201 denotes order information, which includes information for generating a photo book. The order information 201 also includes image information necessary to generate the photo book, or personal information, such as a name or an address, necessary to deliver the photo book. Reference numeral 202 denotes a generating apparatus that generates photo book information. The generating apparatus 202 generates photo book information necessary to generate the photo book, such as a selection of photographs or a layout selection for the photo book, in accordance with the order information 201.

Reference numerals 203, 204, 205, and 206 denote information output from the generating apparatus 202, and are information for printing and book-binding the photo book. Reference numeral 203 denotes multi-tone image information. Reference numeral 204 denotes layout information indicating at what position in a page to arrange an image. Reference numeral 206 denotes bookbinding information indicating a bookbinding type for the photo book. Reference numeral 205 denotes additional information, which is information different to the image information 203, and, for example, various applications, such as audio information or moving image information, text document information, information concerning the image information 203, such as a copyright, image capturing date/time, a capturing location, or a photographer, or completely different image information, can be considered.

Reference numeral 207 denotes a multiplexing apparatus, which is an apparatus for embedding (multiplexing) the additional information 205 in the image information 203, so that the additional information 205 is hard to distinguish visually. The multiplexing apparatus 207 performs multiplexing (overlapping) of the additional information 205, and also performs quantization of input multi-tone image information 203.

Figure 1A:
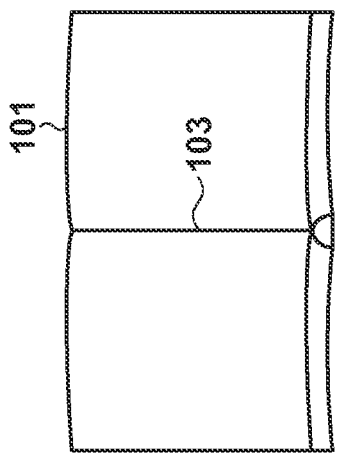
FIGS. 1A to 1C are views for explaining a bookbinding method.
Figure 1B:
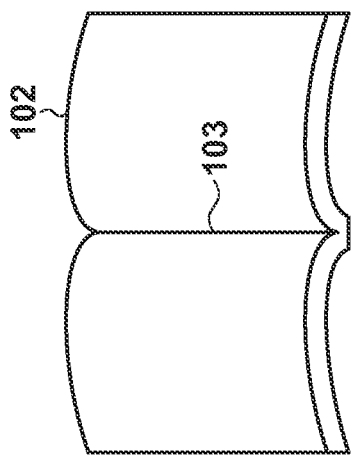

Reference numeral 208 denotes a printer, which outputs information generated by the multiplexing apparatus 207 through a printer engine. A printer that realizes tone representation by using pseudo halftone processing, such as an ink-jet printer, a laser printer, or the like, is envisioned for the printer 208. Processing of the printer 208 includes bookbinding processing, and printed material is bound in accordance with the bookbinding information 206. For example, if bound using a flat type, the binding is as shown in FIG. 1A, and if bound using a non-flat type, the binding is as shown in FIG. 1B. The bookbinding method is not specifically recited, but may be any bookbinding method that uses a typical approach.

For bound printed material, an image sensor 209 of the camera-equipped mobile terminal 105 is used to read information from the printed material, and by a separating apparatus 210 of the camera-equipped mobile terminal 105, additional information embedded in the printed material is separated, and is output as additional information 211. If the obtained additional information 211 is audio information, for example, it is output to a speaker of the camera-equipped mobile terminal 105, or if the additional information 211 is image information, it is output to a display unit of the camera-equipped mobile terminal 105. In addition, an output destination of the additional information 211 may also be an interface that outputs data to an external device. Furthermore, in FIG. 2, the separating apparatus 210 has a configuration of being built into the camera-equipped mobile terminal 105, but the separating apparatus 210 may be realized as an apparatus that is separate to the camera-equipped mobile terminal 105.

Figure 3B:
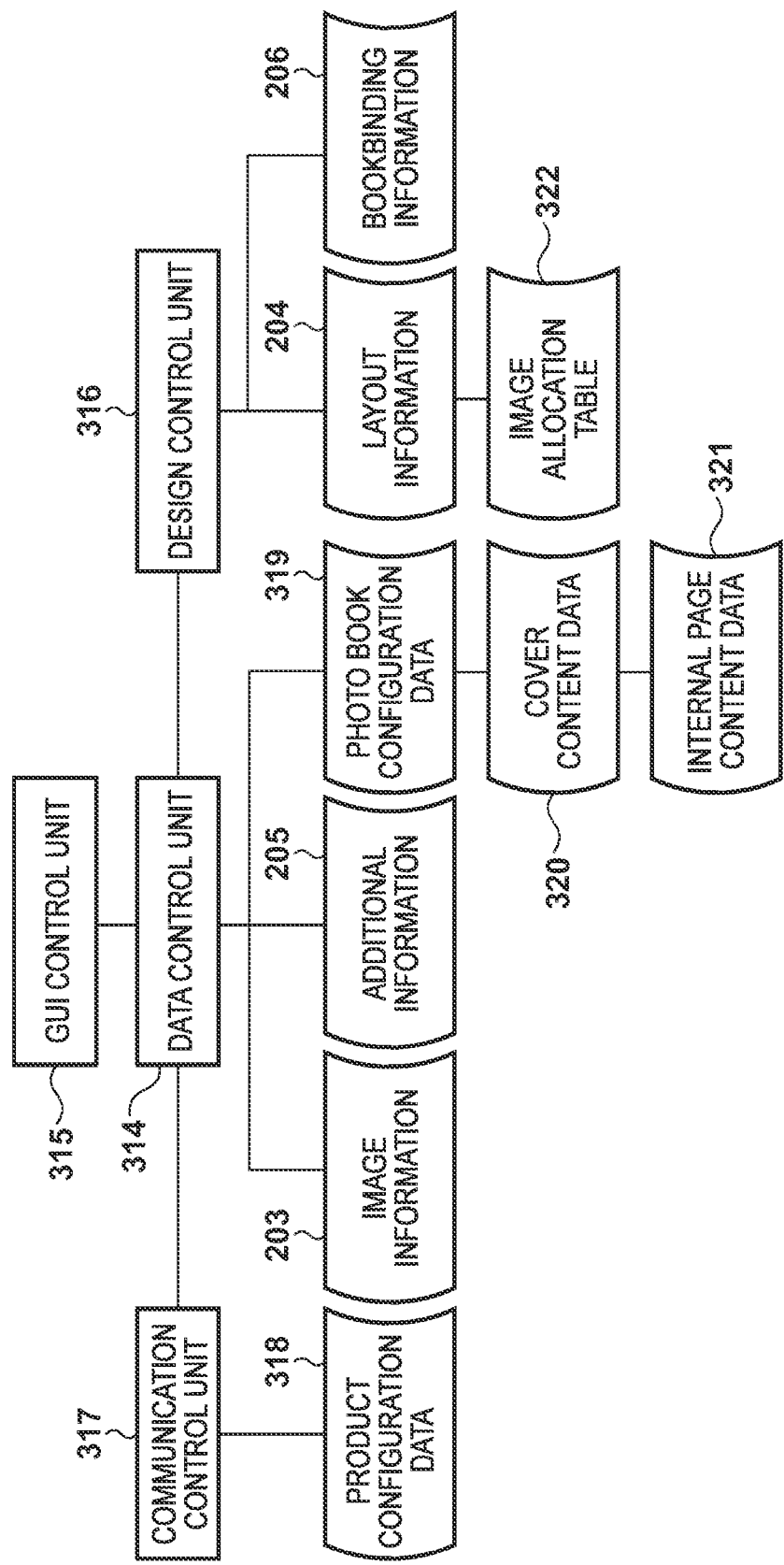

FIGS. 3A and 3B are block diagrams for showing a hardware configuration and a functional configuration of the generating apparatus 202 of FIG. 2.

A display unit 301 of FIG. 3A displays, to a display screen thereof, for example, a document being edited, a graphic, an image, other editing information, a window, an icon, a message, a menu, or other user interface information. A VRAM 302 renders an image to be displayed on the display unit 301. By transferring to the display unit 301 image data generated in the VRAM 302 in accordance with a predetermined specification, an image is displayed on the display unit 301. An external media drive 303 performs a recording reproduction operation with respect to a storage medium represented by a CD or a DVD. A keyboard 304 has various keys for performing character input or various operations. A pointing device 305 is, for example, used to designate and to operate an icon, menu, or other object displayed on the display screen of the display unit 301.

Based on a control program that includes an application stored on a ROM 307, an HDD (hard disk drive) 309, or the external media drive 303, a CPU 306 controls various elements connected to the CPU 306 via a CPU bus 312. The ROM 307 holds various control programs and data. A RAM 308 has various storage regions, such as a work area for the CPU 306, a save region for data at a time of error processing, or a loading area for a control program. The HDD 309 stores various control programs or various data, including an operating system (OS) or an application.

A local communication interface (a local communication I/F) 310 performs control when transmitting/receiving data to/from an external device via a local communication medium. A network interface (I/F) 311 performs communication with an external apparatus, such as another information processing apparatus or a printer, by connecting via a network 313. The CPU bus 312 includes an address bus, a data bus, and a control bus. Note that provision of control programs to the CPU 306 can be performed from the ROM 307, the HDD 309, the local communication I/F 310, or the external media drive 303, and furthermore, can also be performed from another information processing apparatus via the network 313.

An application for generating the photo book is operating on the generating apparatus 202, and is stored as data executable by the OS on the HDD 309. By accepting a user operation through the pointing device 305 or the keyboard 304, the OS maps the data with which the application is executable to the RAM 308, and uses the CPU 306 to execute the application. The application loads image information for displaying a user interface into the VRAM 302, by calling an API function provided by the OS. Upon accepting a user operation to the user interface through the pointing device 305, the keyboard 304, or the like, the OS conveys an event to the application, the event is interpreted, and processing in accordance with the operation is executed.

FIG. 3B is a functional block diagram showing a functional configuration that an application that operates on the generating apparatus 202 implements.

A data control unit 314 manages the image information 203, the additional information 205, photo book configuration data 319, cover content data 320, and internal page content data 321. A GUI control unit 315 controls a GUI for generating the photo book, and provides an operation unit for accepting a user operation, a display unit for displaying editing content, and the like. A design control unit 316 manages and controls design information (layout, template data, or the like) used in the photo book. The design control unit 316 manages layout information 204, an image allocation table 322, and the bookbinding information 206. A communication control unit 317 manages product configuration data 318.

The image information 203 is an image data group selected by the user in an image data selecting step when generating the photo book, and is included in the photo book. The photo book is generated by assigning images selected from the image information 203 to each page of the photo book in the editing and preview steps when generating the photo book. The additional information 205 is additional information data embedded in an image printed in the photo book. The additional information 205 is linked to an image printed in the photo book in an additional information selecting step when generating the photo book.

As basic configuration information for a photo book being generated, the photo book configuration data 319 holds a link to a photo book product, a number of configuring pages, and the cover content data 320, as well as a link to the internal page content data 321. The cover content data 320 holds image data assigned to a cover, a back cover, and a spine cover of the photo book managed by the data control unit 314, and data relating to the drawing positions therefor, a title for the photo book, and additional drawing for a mount. The internal page content data 321 holds data such as image data assigned to a page that configures an interior of the photo book other than the front and back covers, and data relating to a drawing position therefor, a comment for the image data, and additional drawing for a mount portion.

The photo book configuration data 319, the cover content data 320, and the internal page content data 321 is information for the photo book that is being generated, and this information is generated in the editing and preview steps when the photo book is generated.

The layout information 204 is a layout file managed by the design control unit 316, and stores information for determining a location of an image, a character string, or the like, in each double-page spread, and a location of the additional information. The image allocation table 322 is managed by the design control unit 316, and stores information relating to a number of pieces of image data assigned to each page. The bookbinding information 206 stores information for a type of a bookbinding method such as flat, non-flat, or the like. The bookbinding information 206 is generated on the basis of a bookbinding method selected by the user in a product selecting step when generating the photo book. The product configuration data 318 is information relating to options for a product configuration. Each option for the product configuration holds information, such as a photo book size, a number of pages, a paper type, a cover type, a layout, bookbinding type, or the like.

The communication control unit 317 holds the product configuration data 318 in a newest state by appropriately communicating with a communication destination apparatus (a server, or the like, providing a print site, or the like).

FIG. 4 is a flowchart showing processing executed by the generating apparatus 202. In addition, FIGS. 5A to 5D are views showing a user interface (UI) for each step of the flowchart of FIG. 4. Using FIG. 4 and FIGS. 5A to 5D, an explanation is given for each step of creating the photo book information in the generating apparatus 202. Note that the processing shown in FIG. 4 is realized by the CPU 306 of the generating apparatus 202 executing an application (a control program) stored in the HDD 309. The user interfaces (UI) shown in FIGS. 5A to 5D are generated by the application and displayed on the display unit 301.

In step S401 of FIG. 4, the generating apparatus 202 executes a product selecting step. In step S401, the generating apparatus 202 obtains the product configuration data 318, which is information regarding a product configuration that is orderable from a print site using the communication control unit 317. The generating apparatus 202 uses the GUI control unit 315 to display, on the display unit 301, a product selection UI 500, which is an operation screen for selecting a product shown on FIG. 5A, based on the product configuration data 318. Below, all operations to the UI, to the extent that there is no particular clear recitation, for example, can be performed in accordance with a user operation via the keyboard 304 or the pointing device 305, and, in accepting the user operation, the GUI control unit 315 responds, and processing in response to the user operation is executed.

The product selection UI 500 is one of a series of windows presented in a wizard format by the application. The product selection UI 500 has a bookbinding type 501, a number of pages 502, and a layout 503, which are options for the product. The product to be generated is determined by exclusively selecting a radio button for each option.

The bookbinding type 501 represents a bookbinding type for the photo book. Here, prepared as options are a soft cover 5011, a hard cover 5012, and a hard cover (flat) 5013.

The soft cover 5011 is where a cover covering the photo book is made with a soft material, and because the stiffness of the cover is low, the pages bend in comparison to other options. For the bookbinding method, a tight back is used. As shown in FIG. 1B, the tight back is strong because the back of the book is in contact with the contents, but the pages are hard to open. The hard cover 5012 is where a cover covering the photo book is made with a hard material, and because the stiffness of the cover is high, the pages themselves are hard to bend. For the bookbinding method, similarly to the soft cover 5011, a tight back is used. The hard cover (flat) 5013 is a cover that covers the photo book, and similarly to the hard cover 5012, is made with a hard material. For the bookbinding method, a flexible back is used. As shown in FIG. 1A, for the flexible back, although the back and content are in contact with each other, the pages are easy to open, because the back uses a soft material, and it is possible to flatten the gutter portion when opening the photo book.

The number of pages 502 represents a number of pages that configure the photo book. Here, it is possible to exclusively select as an option one of twelve pages, twenty pages, and thirty pages through respectively corresponding radio buttons 5021, 5022, 5023.

The layout 503 represents a photograph layout in a page of the photo book. Here, as an option, it is possible to exclusively select one of two photos (large), four photos (medium), twelve photos (small), with respect to a double-page spread, through respectively corresponding radio buttons 5031, 5032, 5033.

Each of a back button 504, a next button 505, and a cancel button 506 in the lower part of the product selection UI 500 is a button that controls a wizard (window). Wizards other than the product selection UI 500 (FIG. 5B to FIG. 5D) also display the same group of buttons, which function similarly. For example, by pressing (clicking) the back button 504 with the pointing device 305, it is possible to return to a previous wizard. Note that the product selection UI 500 is the first UI (an initial screen) for photo book generation, so the back button 504 is not enabled for the product selection UI 500. For example, by pressing (clicking) the next button 505 with the pointing device 305, it is possible to proceed to a next wizard. With the product selection UI 500, it is possible to transition to an image data selection UI 510 (FIG. 5B) by pressing the next button 505. It is possible to cancel photo book generation and terminate display of the product selection UI 500, for example, by pressing the cancel button 506 with the pointing device 305.

Note that, when the next button 505 of the product selection UI 500 is pressed, information indicating each type of option selected through the product selection UI 500 is stored in the RAM 308 as the layout information 204, the bookbinding information 206, and the image allocation table 322.

In step S402, the generating apparatus 202 executes an image data selecting step. Step S402 is a step of selecting images to be used in the photo book, in which the generating apparatus 202 uses the GUI control unit 315 to display the image data selection UI 510 shown in FIG. 5B on the display unit 301. The user is able to select images to be used in the photo book via the image data selection UI 510. Images to be selected may be stored in the HDD 309, or may be stored in external media inserted into the external media drive 303. In addition, a case in which images to be selected are stored in an external storage apparatus via the local communication I/F 310, the network I/F 311, or the like, is also contemplated. Here, a case in which the images to be selected are stored in the HDD 309 is envisioned.

The image data selection UI 510 has a folder display region 511, a region for displaying images in the folder 512, and a selected image display region 513.

The folder display region 511 displays a list of folders (folder names) that store images. The folder display region 511 displays each folder in a hierarchical structure stretching from a root folder as a starting point to lower folders. When selecting a lower folder, the lower folder is displayed by pressing a + (plus) button at the head of the folder, and then the + (plus) button changes to a − (minus) button. When the − (minus) button is pressed, the displayed lower folder disappears. If the lower folder does not exist, then the + (plus) and − (minus) buttons are not displayed.

The region for displaying images in the folder 512 displays images in the folder selected through the folder display region 511. The selected image display region 513 displays images selected from the region for displaying images in the folder 512.

The user selects a folder in which the image is stored from a list of folders displayed in the folder display region 511. By selecting the folder, images stored in the folder are displayed in the region for displaying images in the folder 512. The region for displaying images in the folder 512 has a vertical scroll bar 514. If all images cannot be fully displayed in the display region of the region for displaying images in the folder 512, it is possible to change images displayed in the region for displaying images in the folder 512 by operating the vertical scroll bar 514 via the pointing device 305. For example, it is possible to display, in the region for displaying images in the folder 512 lower images and upper images, for example, by the user causing the vertical scroll bar 514 to slide down or causing the vertical scroll bar 514 to slide up, respectively, while the user keeps pressing the pointing device 305.

In a state in which an image to be used in the photo book is selected from images in the region for displaying images in the folder 512, it is possible for a user to add the image in the selected state to the selected image display region 513 by pressing an add/delete button 515 with the pointing device 305. By repeatedly performing a similar operation, it is possible to select, and to add to the selected image display region 513 images to be used in the photo book. Meanwhile, in a case of deleting selected images, in a state in which an image is selected from the selected image display region 513, a user is able to delete the image in the selected state from the selected image display region 513 by pressing the add/delete button 515 with the pointing device 305. A transition is made to the next wizard when the next button is pressed after all images are selected.

Note that, when the next button of the image data selection UI 510 is pressed, the image data selected through image data selection UI 510 is stored in the RAM 308 as the image information 203.

In step S403, the generating apparatus 202 executes an additional information selecting step. Step S403 is a step of associating additional information data to images selected in step S402, in which the generating apparatus 202 uses the GUI control unit 315 to display an additional information data selection UI 520 shown in FIG. 5C on the display unit 301. The user is able to select additional information for images selected to be used in the photo book via the additional information data selection UI 520. Additional information data to be selected may be stored in the HDD 309, or may be stored in external media inserted into the external media drive 303. In addition, a case in which it is stored in an external storage apparatus via the local communication I/F 310 or the network I/F 311 is also contemplated. Here, a case in which the additional information data is stored in the HDD 309 is envisioned.

The additional information data selection UI 520 has a selected image display region 521, a folder display region 522, and an additional information data display region 523.

The selected image display region 521 displays images displayed through the selected image display region 513 of the image data selection UI 510. The folder display region 522 displays a list of folders that store the additional information data. A display method or a selection method for a folder is the same as that for the folder display region 511 of the image data selection UI 510. The additional information data display region 523 displays additional information data in a folder selected through the folder display region 522.

A user first selects an image associated with additional information data from the selected image display region 521. For the selected image, a display form therefor is changed so as to show the selected state. In the selected image display region 521 of FIG. 5C, for example, an image F is in a selected state, and has a display form (hatching display) that is different from that of other images in a deselected state.

Next, by a user selecting a folder from the folder display region 522 in which additional information data is stored, the additional information data stored in the folder is displayed in the additional information data display region 523. By a user selecting additional information data to associate from the displayed additional information data and pressing an association button 525 with the pointing device 305, an association between the image data of the image in the selected state and the selected additional information data is completed. For image data for which an association is completed, a star mark 524, which is an indicator showing the completion, is displayed on the top-left of the image. After the completion of association, when the next button is pressed, a transition is made to the next wizard.

Note that, when the next button of the additional information data selection UI 520 is pressed, the additional information data selected through the additional information data selection UI 520 is stored in the RAM 308 as the additional information 205.

In step S404, the generating apparatus 202 executes an editing & preview step. Step S404 is a step of performing editing of the photo book and a preview to confirm the editing content, in which the generating apparatus 202 uses the GUI control unit 315 to display an editing & preview UI 530 shown in FIG. 5D on the display unit 301. A user is able to exchange the placement of images in a page of the photo book or exchange an image spanning pages, via the editing & preview UI 530. In addition, a user is capable of adding text or a decoration to a page of the photo book, and confirming the preview screen, via the editing & preview UI 530.

The editing & preview UI 530 has a thumbnail window 531, a preview window 532, and an exchange candidate image display region 533.

A user first selects, via the thumbnail window 531, a page to edit. For the thumbnail window 531, a double-page spread is displayed with a plurality of pages in a thumbnail state, and pages are arranged by being arrayed in order. With the thumbnail window 531, when a page is selected, images arranged in the selected page are displayed on the preview window 532. The preview window 532 of FIG. 5D shows a case in which two images are arranged on each page of a double-page spread. With the preview window 532, it is possible to exchange images in a page by selecting one image, moving it to another image, and cancelling the selection while the one image is still selected. Note that, for an image selected through the preview window 532, a display form therefor is changed to show the selected state thereof. With the thumbnail window 531 of FIG. 5D, the pages on the left side are in a selected state, and other pages in a deselected state have a different display form.

Meanwhile, it is possible to perform a change of exchanging an image in a page with any image on the exchange candidate image display region 533, by selecting one image through the preview window 532, and cancelling the selection at a position of any image on the exchange candidate image display region 533, while the one image is selected. On the preview window 532, after pressing a text addition button 534 while the page is caused to be displayed, when a location in the preview window 532 in which to add text is indicated, it is possible to add arbitrary text to the indication position. When a decoration addition button 535 is pressed, a different window that displays a decoration group to be added to the image is displayed. It is possible to add a decoration to the location when a location of the preview window 532 at which to add the decoration is indicated after an arbitrary decoration is selected from the decoration group displayed on the different window. It is possible to select text or a decoration on the preview window 532, and freely move it. After the completion of editing, when the next button is pressed, a transition is made to the next wizard. Note that, when processing of step S404 is completed, photo book data reflecting the post-editing content is generated, and then stored in the HDD 309. When the next button of the editing & preview UI 530 is pressed, information relating to the state of the editing & preview UI 530 is stored in the RAM 308 as the photo book configuration data 319, the cover content data 320, and the internal page content data 321.

In step S405, the generating apparatus 202 executes an order step. First, the generating apparatus 202 uses the communication control unit 317 to upload the photo book data generated in step S404 to the print site. After the completion of the upload, the print site replies to the generating apparatus 202 with an ID associated with the upload. The generating apparatus 202 displays, on the display unit 301, a display of an order page, associated with the received ID, for the print site. Using the order page, it is possible to designate a clearance approach or a delivery destination for the photo book. These processes are similar to those for a common Web-based order site for a photo book, so details thereof are omitted.

Using the above processing, it is possible to generate information relating to generation of a photo book. Note that the method of generating the photo book is not limited to the above-described method, and another method of generating could be used.

<Multiplexing Apparatus>

Next, explanation is given for an additional information multiplexing method that uses the multiplexing apparatus 207 of FIG. 2. Here, first explanation is given of a common method of multiplexing additional information, and a characteristic additional information multiplexing method in accordance with the present embodiment will be explained later. In other words, first explanation is given of a conventional method of multiplexing additional information to a single sheet of paper, or a multiplexing method used in a case in which the hard cover (flat) 5013 is selected as the bookbinding type selected through FIG. 5A for the photo book that is a printing target item.

Figure 6:
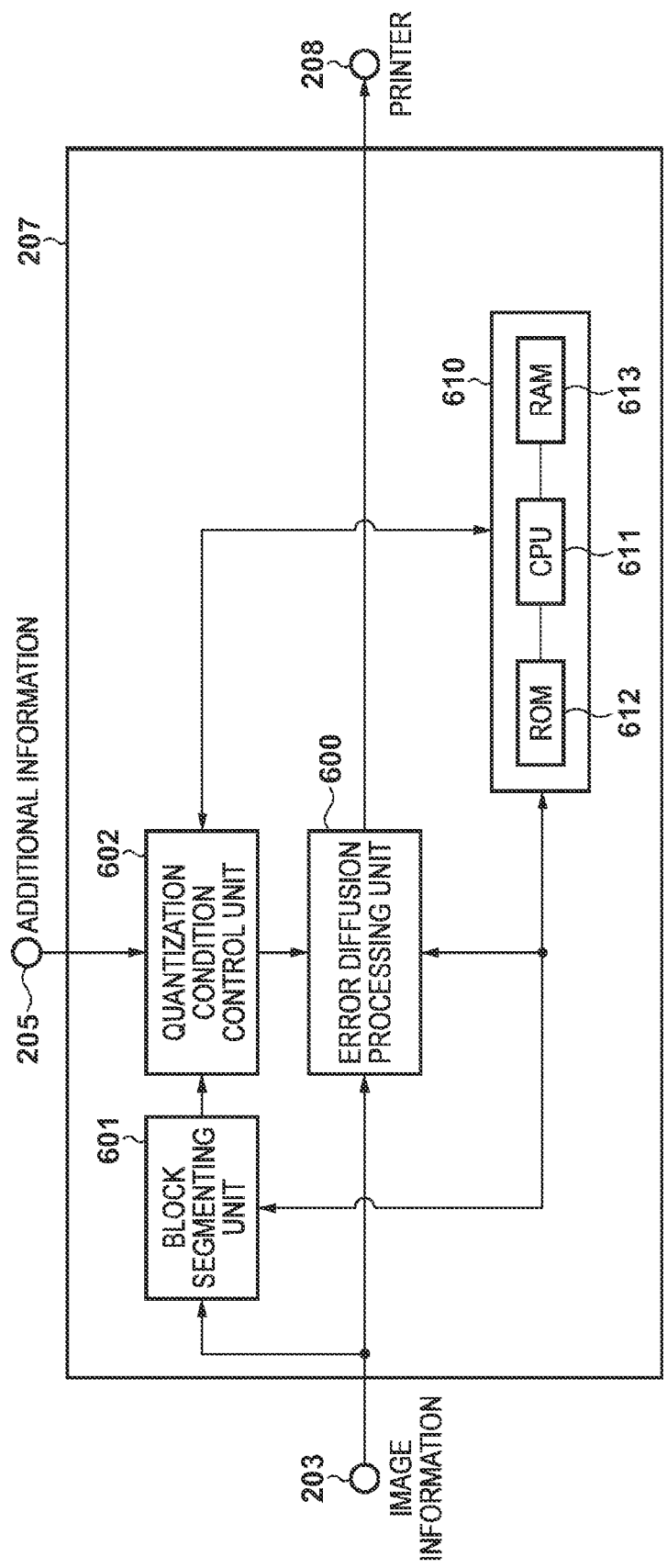
FIG. 6 is a block diagram for illustrating a hardware configuration of a multiplexing apparatus.

FIG. 6 is a block diagram for illustrating a hardware configuration for the multiplexing apparatus 207 of FIG. 2.

A reference number 600 denotes an error diffusion processing unit, which, by performing pseudo halftone processing that uses an error diffusion method on the image information 203 input through an input terminal, converts the image information 203 to a quantization level smaller than an input number of gradations, and expresses tone characteristics for an area by using quantization values for a plurality of pixels. Details regarding the error diffusion processing are explained later.

A reference numeral 601 denotes a block segmenting unit, which performs block segmenting to segment the input image information 203 into units of a predetermined region (for example, a block unit). For the block segmenting performed by the block segmenting unit 601, a configuration may be taken to use a rectangle, or a configuration may be taken to perform segmenting into a region other than a rectangle. A configuration may also be taken such that inside an image the size of the rectangles changes.

Reference numeral 602 indicates a quantization condition control unit, which changes and controls a quantization condition for a predetermined region unit that was block segmented by the block segmenting unit 601. The quantization condition control unit 602 controls the quantization condition at a block unit, based on the additional information 205 input through the input terminal.

Reference numeral 610 denotes a control unit that has a CPU 611, a ROM 612, and a RAM 613. The CPU 611 controls operations and processing for various elements of the multiplexing apparatus 207 in accordance with a control program held in the ROM 612. The RAM 613 is used as a work area for the CPU 611.

Figure 7:
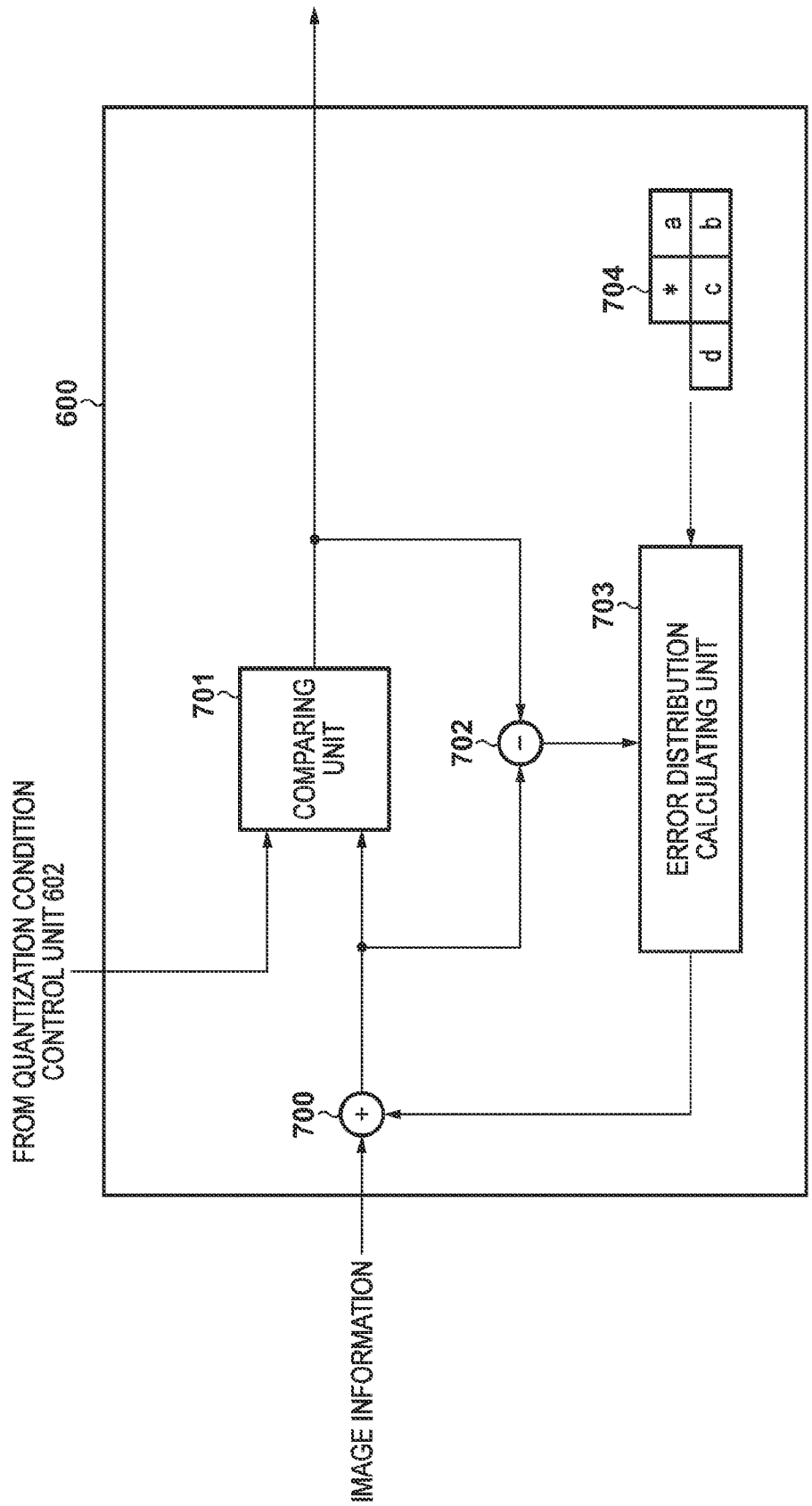
FIG. 7 is a block diagram for illustrating a detailed configuration of an error diffusion processing unit.

FIG. 7 is a block diagram for illustrating a detailed configuration of the error diffusion processing unit 600. Note that, for generic error diffusion processing, details thereof are described in document R. Floyd & L. Steinberg: "An Adaptive Algorithm for Spatial Grayscale", SID Symposium Digest of Paper page 3637 (1975), for example. Here, an explanation is given of an example of error diffusion processing in which a quantization value is binary.

Reference numeral 700 denotes an adder, which adds, to a target pixel value for input image information 203, a quantization error distributed amongst peripheral pixels that are already binarized. A quantization threshold from the quantization condition control unit 602 and an addition result for an added error are compared by a comparing unit 701, and when the addition result is larger than the predetermined threshold "1" is output; otherwise, "0" is output. For example, when expressing a tone for a pixel by using a precision of eight bits, it is typical to express by using a maximum value of "255" and a minimum value of "0". Here, when the quantization value is "1", a dot (ink, toner, or the like) is printed on a recording medium. The reference numeral 702 indicates a subtractor, which calculates an error between the quantization result and the addition result from the adder 700, and then distributes the error to peripheral pixels to which further quantization processing is to be applied based on an error distribution calculating unit 703.

For an error distribution ratio, a distribution table 704 is held in advance for an error set experimentally based on a relative distance to the target pixel, and the error is distributed based on a distribution ratio set in the distribution table 704. The distribution table 704 of FIG. 7 shows a distribution table for a peripheral four pixels, but is not limited to this.

Figure 8A:
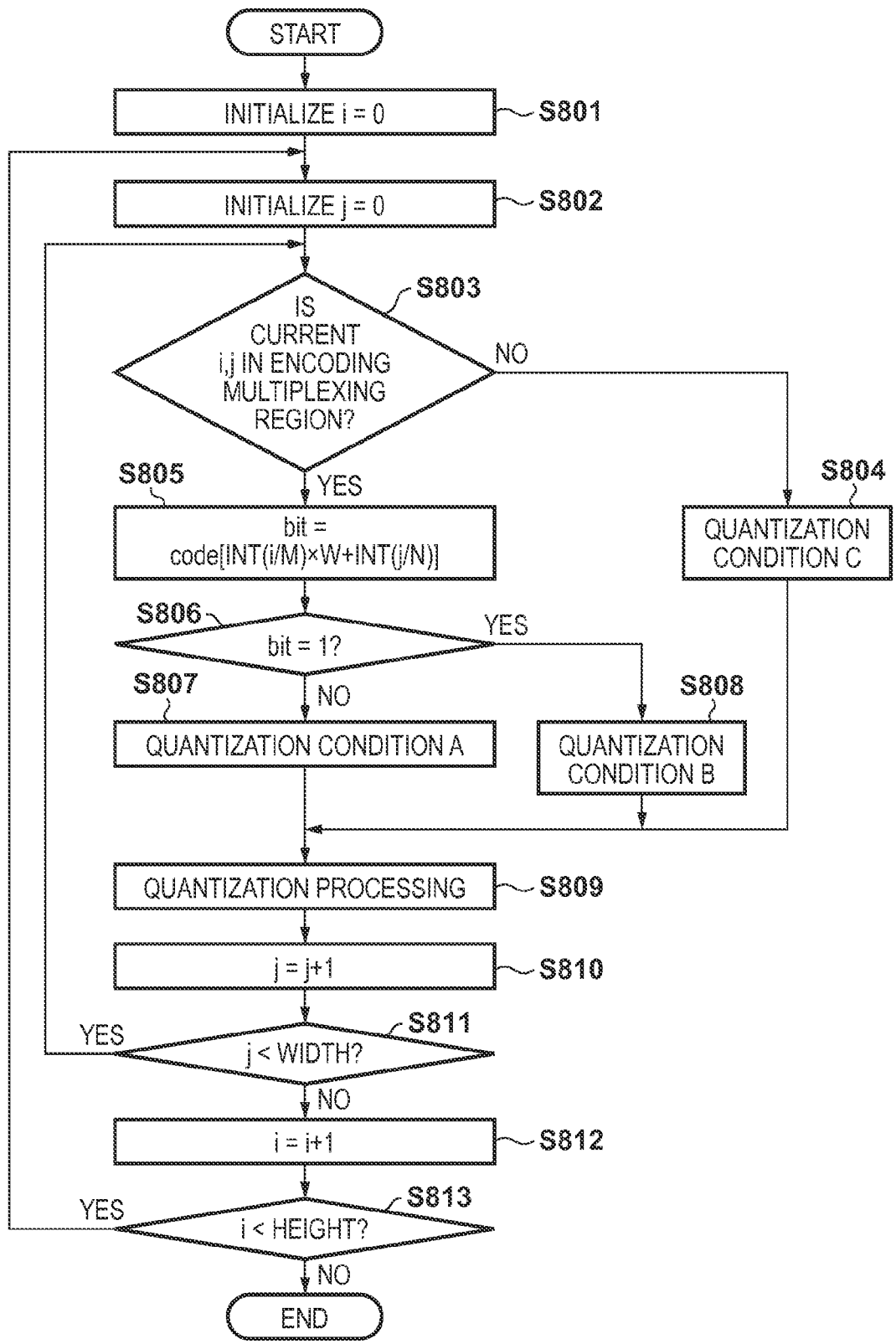
FIGS. 8A to 8C are flowcharts for illustrating processing executed by the multiplexing apparatus.
Figure 8B:
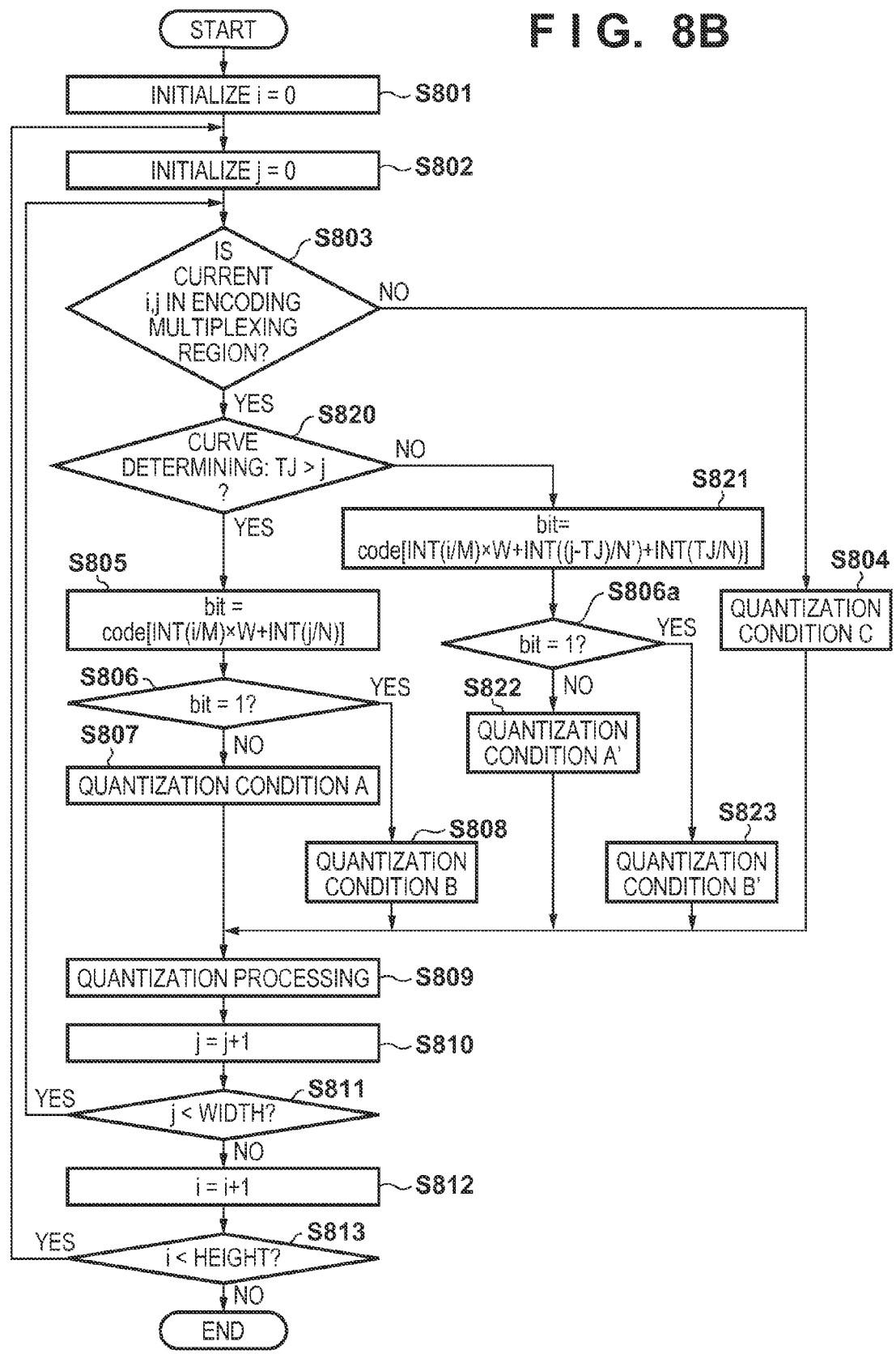
Figure 8C:
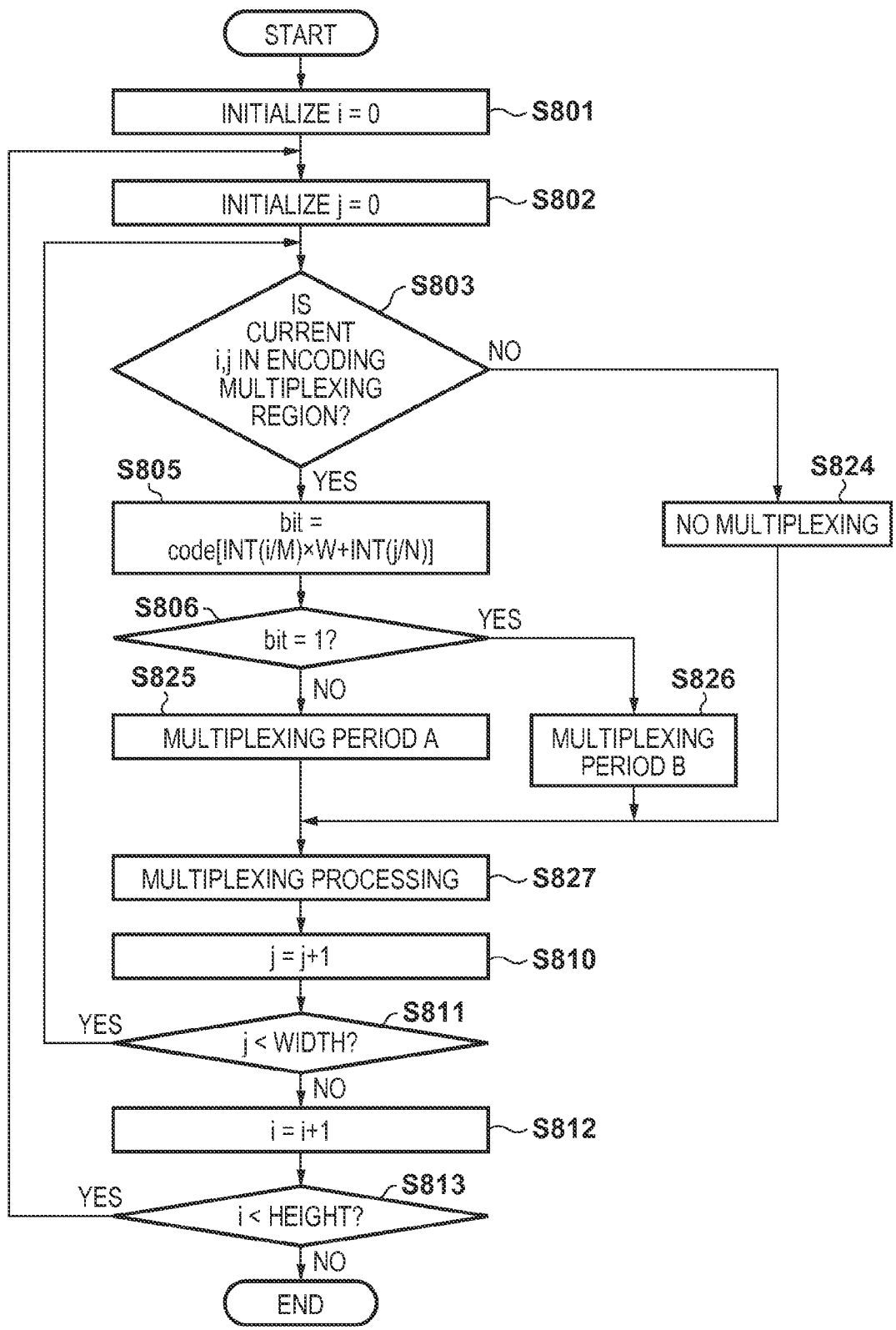

Next, using the flowchart of FIG. 8A, an explanation is given regarding a basic operational procedure of the whole that includes the quantization condition control unit 602. Here, explanation is given of an example when the quantization value is binary. Note that the processing shown in FIGS. 8A to 8C is realized by the CPU 611 of the multiplexing apparatus 207 executing a control program stored in the ROM 612.

In step S801, the multiplexing apparatus 207 initializes a variable i (i=0). The variable i is a variable for counting an address in a vertical (portrait) direction of an image to be processed. In step S802, the multiplexing apparatus 207 initializes a variable j (j=0). The variable j is a variable for counting an address in a horizontal (landscape) direction of an image to be processed. In step S803, the multiplexing apparatus 207 executes a determination by using address values of (i, j). More specifically, it is determined whether coordinates (i, j) (a target pixel to be processed), which are the current processing addresses, is in a region (a multiplexing region) for which a multiplexing process should be executed.

An explanation is given using FIG. 9A regarding the multiplexing region. FIG. 9A shows one image, comprised of a horizontal number of pixels WIDTH and a vertical number of pixels HEIGHT. Now, multiplexing the additional information to within the image is assumed. A configuration is made to take the top left of the image as an origin point, and block segmenting is performed with in units of N×M pixels, in which there are N horizontal pixels and M vertical pixels. Here, block segmenting is performed by using the origin point (the top-left corner of the image) as a reference point, but setting may be performed to use a point separated from the origin point as the reference point. When multiplexing a maximum amount of information in the image, N×M blocks are arranged from the reference point. In other words, when a number of blocks that can be arranged in the horizontal direction is W and a number of blocks that can be arranged in the vertical direction is H, the following relationship is configured.

$$W = INT(WIDTH/N) \quad (1)$$

$$H = INT(HEIGHT/M) \quad (2)$$

Note that INT( ) indicates an integer part of what is inside the parentheses.

A remainder number of pixels that cannot be divided in the formulas (1), (2) corresponds to an end portion when a plurality of N×M blocks are arranged, and the end portion is outside the multiplexing region.

In step S803, when the target pixel is not in the multiplexing region (NO in step S803), in step S804, the multiplexing apparatus 207 sets a quantization condition C. In contrast, when the target pixel is in the multiplexing region, (YES in step S803), in step S805, the multiplexing apparatus 207 reads additional information that is to be multiplexed. Here, for ease of the explanation, it is assumed that the additional information uses an array called code[ ] to express each single bit. For example, assuming that the additional information is 48 bits of information, the array code[ ] stores each single bit from code[0] to code [48].

Note that, in step S805, the additional information is read by assigning information in the array code[ ] for a variable bit, as follows.

$$bit = code[INT(i/M) \times W + INT(j/N)] \quad (3)$$

In step S806, the multiplexing apparatus 207 determines whether the assigned variable bit is "1" (bit=1). Because information in the array code[ ] stores each one bit, this shows that the value of the variable bit is either of "0" or "1". When the variable bit is "0" (NO in step S806), in step S807, the multiplexing apparatus 207 sets the quantization condition A. However, when the variable bit is "1" (YES in step S806), in step S808, the multiplexing apparatus 207 sets the quantization condition B.

In step S809, the multiplexing apparatus 207 performs quantization processing based on the set quantization condition. The quantization processing corresponds to the error diffusion method explained in FIG. 7. In step S810, the multiplexing apparatus 207 increments the horizontal direction variable j (increments by 1). In step S811, the multiplexing apparatus 207 determines whether the horizontal direction variable j, which is the number of processed pixels, is less than WIDTH, which is the horizontal number of pixels for the image (j<WIDTH). If the number of processed pixels is less than WIDTH (YES in step S811), the processing returns to step S803, and the processing from step S803 to step S810 is repeated thereafter until the number of processed pixels becomes greater than or equal to WIDTH.

If, however, the number of processed pixels is greater than or equal to WIDTH (NO in step S811), in step S812, the multiplexing apparatus 207 increments the vertical direction variable i (increments by 1). In step S813, the multiplexing apparatus 207 determines whether the vertical direction variable i, which is a number of processed pixels, is less than HEIGHT, which is the vertical number of pixels for the image. If the number of processed pixels is less than HEIGHT (YES in step S813), the processing returns to step S802, and the processing of step S802 to step S812 is repeated thereafter until the number of processed pixels becomes greater than or equal to HEIGHT. If the number of processed pixels is greater than or equal to HEIGHT (NO in step S813), the processing terminates.

Through the above operational procedure, it is possible to change the quantization condition by using a block unit comprised of N×M pixels.

An explanation is given of examples of the quantization conditions A, B, and C. There are various factors for a quantization condition in the error diffusion method, but here it is assumed that the quantization condition is a quantization threshold. Usage of the quantization condition C is outside of the multiplexing region, so the quantization threshold may be anything. As described above, when a quantization level is binary and a tone representation is made by eight bits for one pixel, a maximum of "255" and a minimum of "0" are quantization representative values, but an intermediate value therebetween of "128" is often set as the quantization threshold. In other words, the quantization condition C is a condition that fixes the quantization threshold to "128".

The quantization condition A and the quantization condition B are used in a block (a multiplexing block) in the multiplexing region, so differences in image quality due to different quantization conditions must be generated. Differences in image quality, however, must be expressed so as to be difficult to determine visually, and such that one cannot distinguish them easily from printed material.

Figure 10A:
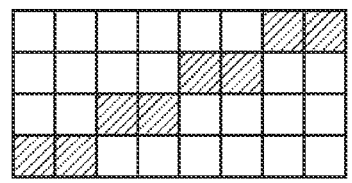
FIGS. 10A to 10D are views for illustrating examples of a threshold of a quantization condition.
Figure 10B:
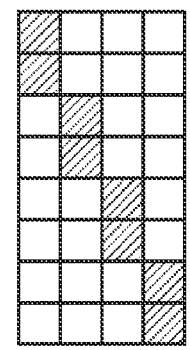

FIG. 10A and FIG. 10B are an example of the quantization condition A and the quantization condition B. FIG. 10A shows a period of a change to the quantization threshold in the quantization condition A. In the drawing, it is assumed that one cell is a portion for one pixel, a fixed threshold is set for white cells, and a variable threshold is set for hatched cells. In other words, in the example of FIG. 10A, a matrix of eight horizontal pixels and four vertical pixels is assembled, and only thresholds for hatched cells are set as thresholds with protruding values. Note that quantization conditions are held in a memory to which the quantization condition control unit 602 is able to refer.

FIG. 10B shows a period of a change to the quantization threshold in the quantization condition B. In other words, in the example of FIG. 10B (that is different from FIG. 10A), a matrix of four horizontal pixels and eight vertical pixels is assembled, and only thresholds for hatched cells are set as thresholds for protruding values.

Here, when one pixel is an eight-bit gradation value, as an example, "128" is set as the fixed threshold, and "10" is set as a protruding threshold. When the quantization threshold becomes low, it is easier for the quantization value of the target pixel to become "1" (quantization representative value "255"). In other words, in both FIG. 10A and FIG. 10B, it becomes easier to line up the quantization value "1" in the ordering of the hatched cells in the drawings. In other words, for each block of N×M pixels, blocks in which dots occur within the order of the hatched cells of FIG. 10A, are mixed with blocks in which dots occur within the order of the hatched cells of FIG. 10B.

A certain amount of change for the quantization threshold in the error diffusion method does not have a large effect with respect to image quality. In an ordered dither method, image quality of tone representation is largely governed by a dither pattern that is used. With an error diffusion method that regularly applies a change for a quantization threshold, because tone representation that determines image quality is an error diffusion method, changing the order of dots somewhat, changing the occurrence of a texture, or the like, for the most part, however, does not have an influence on the image quality of tone representation. Even if the quantization threshold is changed, because an error that is a difference between a signal value and the quantization value is distributed to surrounding pixels, an input signal value is saved in a macro sense. In other words, regarding generation of a texture or an order of dots in an error diffusion method, redundancy becomes very large.

Incidentally, in the above explanation, multiplexing is realized by overlapping a predetermined periodicity representing a code in a quantization threshold of the error diffusion method, but the following schemes can also be considered:

A scheme of directly multiplexing a periodicity to RGB luminance information;

A scheme of multiplexing a periodicity after separating RGB luminance information into luminance-color difference information (for example, Y, Cr, Cb signals or L*, b*, a*); and A scheme of multiplexing a periodicity after separating RGB luminance information into ink colors (for example, CMYK signals).

Here, regarding the scheme of directly multiplexing the periodicity to RGB luminance information, an explanation is given using FIG. 2, FIG. 8C, and FIGS. 10A-10D. The scheme of directly multiplexing the periodicity to RGB luminance information is applicable to RGB data. In other words, the scheme of directly multiplexing the periodicity to RGB luminance information can be applied to the image information 203 of the generating apparatus 202 in FIG. 2, or data before being converted to a non-RGB scheme by the multiplexing apparatus 207 (for example, before converting to CMYK for ink colors). In the above explanation, multiplexing of a period is realized by using the error diffusion method, but here, a multiplexing period is directly applied to RGB. Using FIG. 8C, an explanation is given of a method of directly applying a multiplexing period to RGB data. In FIG. 8C, for processing that is the same as shown in FIG. 8A, the same step number is added, and a detailed explanation thereof is omitted.

In step S803, the multiplexing apparatus 207 determines whether the target pixel is in the multiplexing region, and then, if the target pixel is not in the multiplexing region (NO in step S803), in step S824, the multiplexing apparatus 207 does not perform multiplexing. In other words, this means that no processing is performed on the RGB data.

If, however, the target pixel is in the multiplexing region (YES in step S803), after passing step S805, if the variable bit is "0" (NO in step S806), in step S825, the multiplexing apparatus 207 selects the multiplexing period A. However, when the variable bit is "1" (YES in step S806), in step S826, the multiplexing apparatus 207 selects the multiplexing period B.

In step S827, the multiplexing apparatus 207 performs the multiplexing process based on the selected the multiplexing condition ("multiplexing period A", "multiplexing period B", or "no multiplexing"). Regarding the method of multiplexing the periodicity on the RGB data, an explanation is given using FIGS. 10A-10D. In the above explanation, for FIG. 10A and FIG. 10B, an explanation was given with the quantization condition A and the quantization condition B, respectively, but here, an explanation is given with each interpreted as the multiplexing period A and the multiplexing period B, respectively.

Figure 10C:
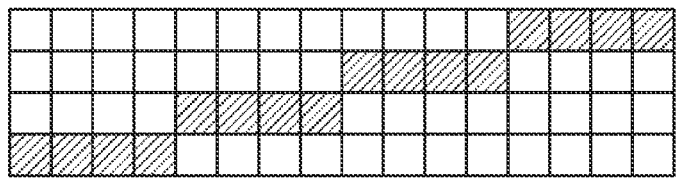
Figure 10D:
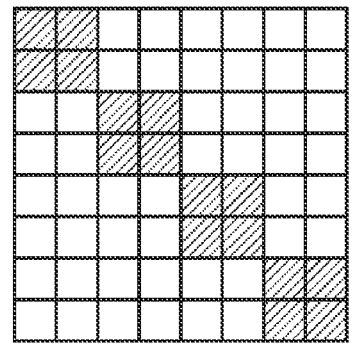

In step S827, if the multiplexing period A has been selected, the multiplexing apparatus 207 executes filtering processing via a filter shown in FIG. 10A on one M×N multiplexing block. For example, when applying a multiplexing period to 8-bit data, it is assumed that Rout=Rin+5, Gout=Gin+5, Bout=Bin+5 for the white cell blocks of FIG. 10A. For hatched cell blocks, it is assumed that Rout=Rin−5, Gout=Gin−5, Bout=Bin−5. However, if the RGB data is less than 0 or greater than 255, a replacement to 0, 255 is performed respectively. By repeating the multiplexing period A, it is possible to apply a multiplexing period as shown in FIG. 10C to the RGB data of the original image. When the multiplexing period B is applied, by performing similar processing using the filter shown in FIG. 10B, it is possible to apply a multiplexing period as shown in FIG. 10D.

<Separating Apparatus>

Next, an explanation is given for the separating apparatus 210 in the image processing system of FIG. 2.

Figure 11:
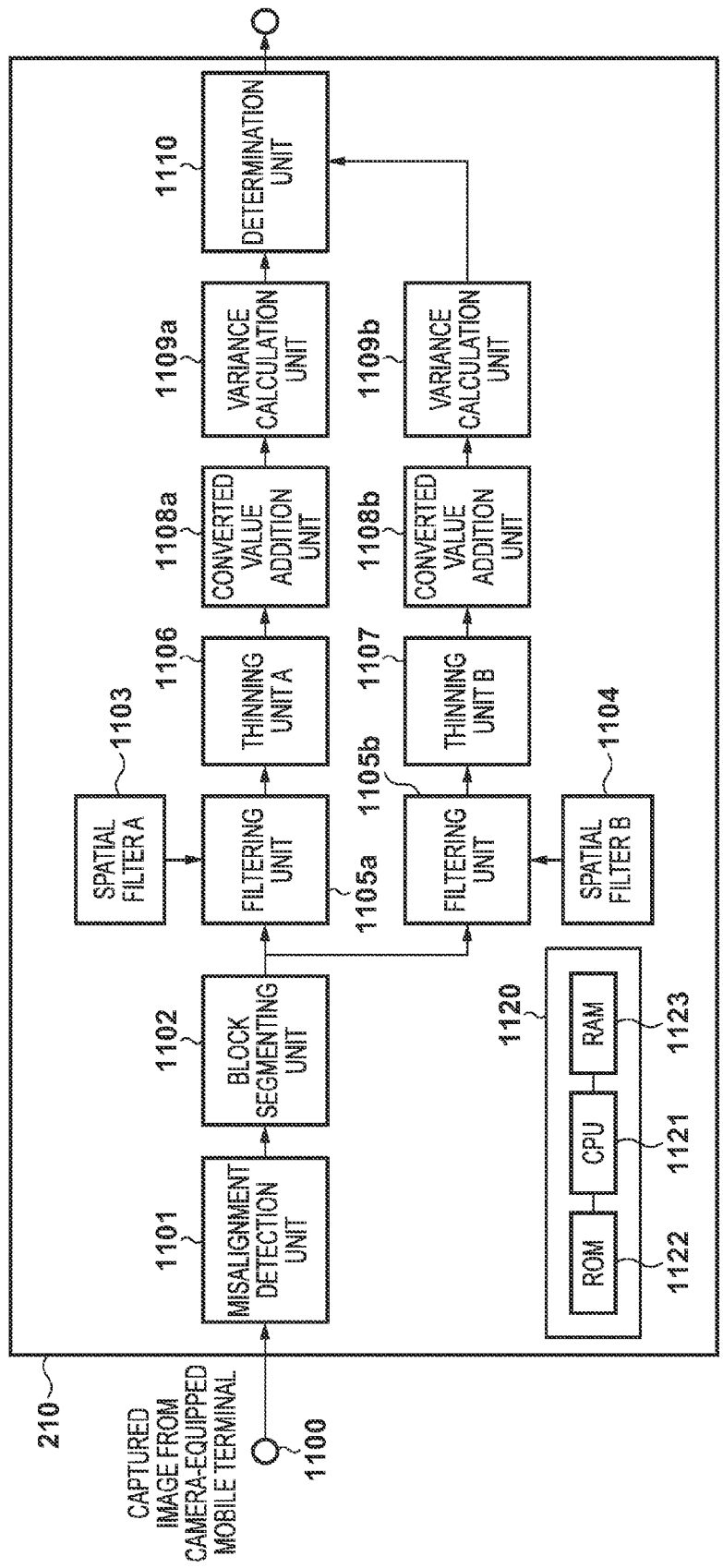
FIG. 11 is a block diagram for a hardware configuration of a separating apparatus.

FIG. 11 is a block diagram for illustrating a hardware configuration for the separating apparatus 210 of FIG. 2. To simplify the explanation, similarly to the example of the multiplexing apparatus 207, an explanation is given of an example of separating additional information from printed material to which each bit of the additional information is multiplexed in divided blocks. In such a case, the amount of additional information in one block in the multiplexing apparatus 207 and the amount of separated information in one block in the separating apparatus 210 are equal.

Reference numeral 1100 denotes an input terminal, which inputs image information read via the image sensor 209 of the camera-equipped mobile terminal 105. It is possible to configure the resolution of the image sensor 209 used to be equivalent or exceeding the resolution of the printer 208 that generates the printed material. Note that, in order to accurately read dot scatter information of the printed material, the image sensor 209 needs a resolution two or more times that of the printer 208, under sampling theory. If, however, the resolution of the image sensor 209 is equivalent or exceeding the resolution of the printer 208, even if not accurate, it is possible to identify that dots are scattered to a certain extent. Here, to simplify the explanation, it is assumed that the resolution of the printer 208 is the same resolution as the resolution of the image sensor 209.

Reference number 1101 denotes a misalignment detection unit, which detects a geometrical misalignment of an image captured by the image sensor 209 of the camera-equipped mobile terminal 105. Because image information input from the input terminal 1100 passes being output from the printer 208 and being captured by the camera-equipped mobile terminal 105, it may be largely geometrically misaligned with respect to the image information before output from the printer 208. Accordingly, the misalignment detection unit 1101 detects from the image information a boundary line between the printed material and outside of the printed material through edge detection.

Figure 12A:
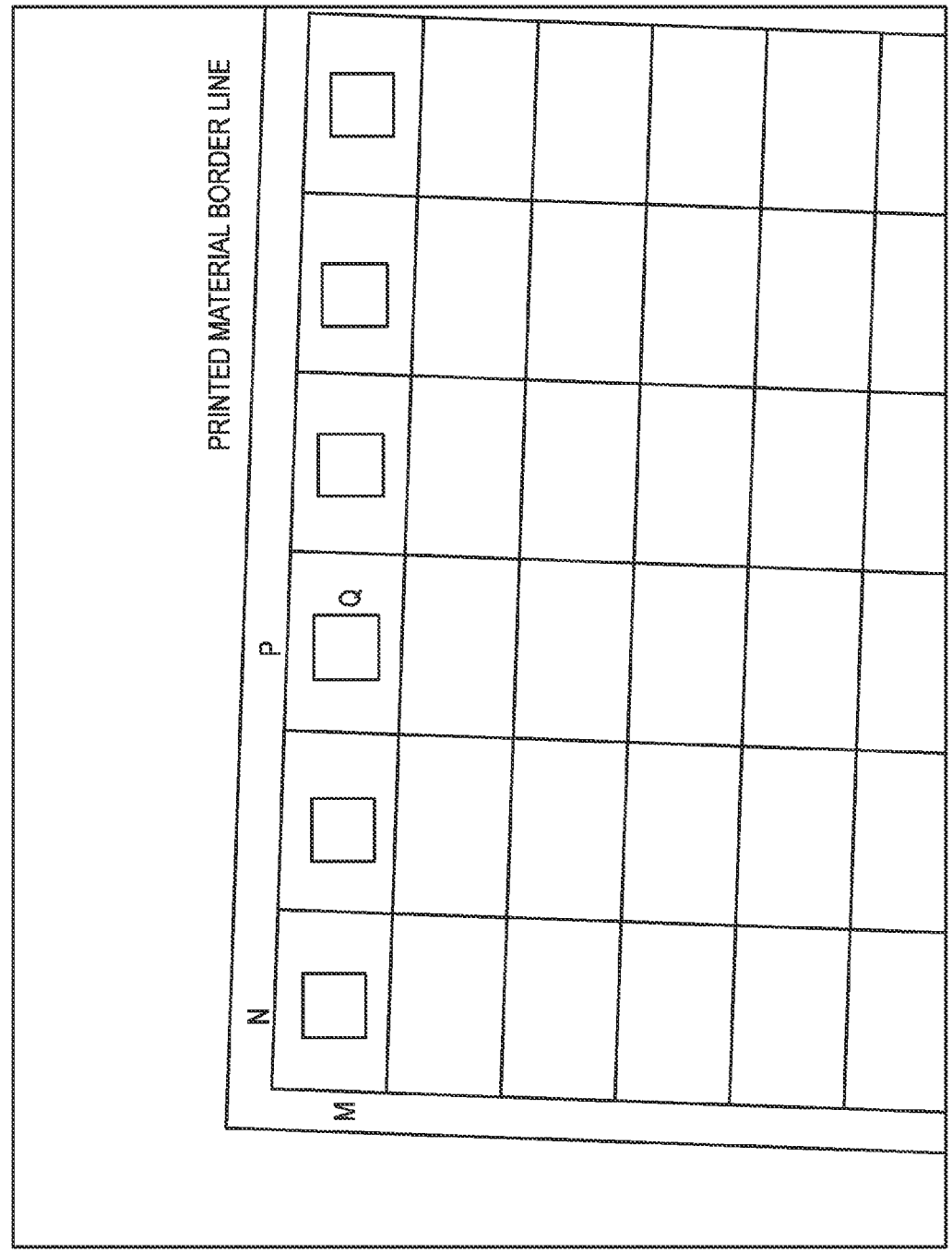

FIG. 12A is a view for illustrating an example of a captured image. Here, when the resolution of each of the printer 208 and the image sensor 209 is the same, a large cause for a need to correct a rotation direction (a tilt) of a captured image is due to skew of a recording medium at a time of printing by the printer 208, a misalignment at a time of capturing the printed material by the image sensor 209, or the like. Therefore, by detecting a boundary line of the printed material from the captured image, it is possible to determine to what extent a misalignment has occurred due to the rotation direction.

Reference numeral 1102 denotes a block segmenting unit, which block segments in P×Q pixel units of P horizontal pixels and Q vertical pixels. The blocks must be smaller than the N×M blocks in the block segmenting at the time of overlapping the additional information. In other words, the relationship $$P<=N, \text{ and } Q<=M \quad (4)$$

is established.

For the block segmenting of P×Q pixel units, block segmenting is performed by skipping each fixed interval (a certain number of pixels). In other words, block segmenting is performed so that one block of P×Q pixel units is contained in a region envisioned as blocks of N×M pixel units at a time of multiplexing. For a skipped number of pixels, a horizontal portion of N pixels and a vertical portion of M pixels are a basis, but it is necessary to correct, by using a number of blocks to identify, an amount of misalignment detected by the misalignment detection unit 1101, calculating the amount of misalignment per block, and adding this to the skipped number of pixels.

FIG. 12B is a view for illustrating an example of a captured image when a camera is inclined with respect to the printed material. In this case, as well, it is possible to correct spatial misalignment by using a boundary line of the printed material from the captured image to execute a projection transformation. It is also possible to perform block segmenting at high speed by printing a visually hard-to-see mark for each block above a boundary line of the printed material, and analyzing the mark from the captured image and using the mark in correction.

Reference numbers 1103 and 1104 respectively indicate the spatial filters A and B, which have characteristics different from each other. Reference numerals 1105a and 1105b denote filtering units that perform digital filtering by respectively using the spatial filter A 1103 and the spatial filter B 1104 to calculate a sum of products with respect to neighboring pixels. The respective filter coefficients for the spatial filter A 1103 and the spatial filter B 1104 are generated suitably for the period of the variable threshold of the quantization condition at the time of multiplexing.

Here, it is assumed that the additional information is multiplexed by using the two kinds of periodicity of FIG. 10A and FIG. 10B in a change to the quantization condition in the multiplexing apparatus 207. Examples of the spatial filter A 1103 and the spatial filter B 1104 used in the separating apparatus 210 at this point are respectively shown in FIG. 13A and FIG. 13B. In the drawings, a central portion of 5×5 pixels are pixels of interest, and a portion for the twenty-four other pixels are the peripheral pixels. In the drawings, a blank portion pixel represents that the filter coefficient is "0". As is apparent from the figures, FIG. 13A and FIG. 13B are filters for edge emphasizing. Moreover, directionality for an edge to be emphasized and directionality for a variable threshold at the time of multiplexing match. In other words, generation is performed so that FIG. 13A matches the periodicity of FIG. 10A, and FIG. 13B matches the periodicity of FIG. 10B.

Reference numbers 1106 and 1107 respectively denote a thinning unit A and a thinning unit B, which execute thinning-out processing to thin out pixels based on a regularity, with respect to a signal (hereafter, referred to as a converted value) that has been filtered in a block of P×Q pixels. Here, processing is performed having separated the regularity of the thinning for a periodicity and a phase. In other words, the periodicity of thinning differs for the thinning unit A 1106 and the thinning unit B 1107, and each executes a plurality of thinning-out processes that change the phase. A method of thinning is explained later.

Reference numerals 1108a and 1108b are converted value addition units, which execute an addition process to add up converted values respectively thinned by the thinning unit A 1106 and the thinning unit B 1107 for each respective phase. The thinning processing and converted value addition processing corresponds to extracting a power for a predetermined frequency vector emphasized by each of the spatial filter A 1103 and the spatial filter B 1104.

Reference numerals 1109a and 1109b denote variance calculation units, which calculate a variance for a plurality of add-up values added up for each phase in respective periodicities. Reference numeral 1110 denotes a determination unit, which determines a multiplexed code based on variance in periodicity calculated by each of the variance calculation units 1109a and 1109b.

Reference numeral 1120 denotes a control unit that has a CPU 1121, a ROM 1122, and a RAM 1123. The CPU 1121 controls operations and processing for various elements of the separating apparatus 210 in accordance with a control program held in the ROM 1122. The RAM 1123 is used as a work area for the CPU 1121.

Figure 14:
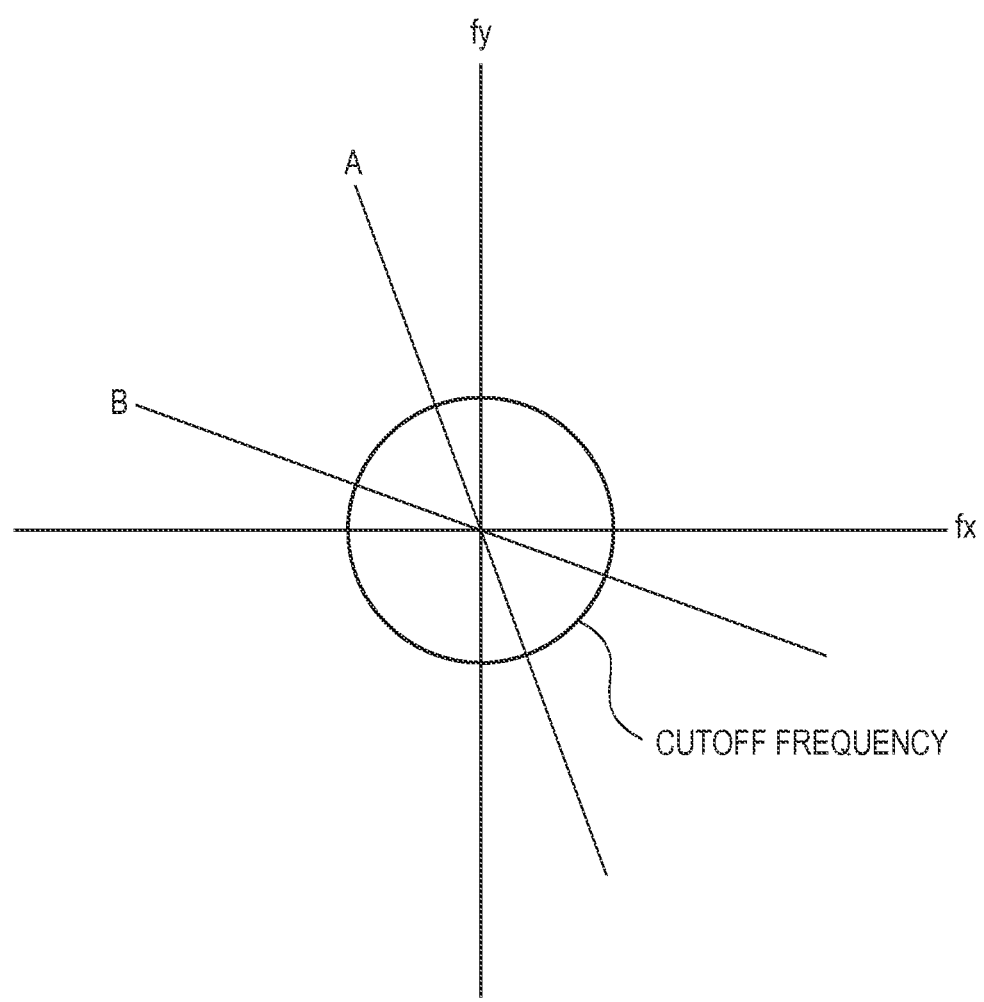
FIG. 14 is a view for explaining a frequency transformation for the multiplexing region.

FIG. 14 is a view for explaining a frequency transformation for the multiplexing region (a two-dimensional frequency domain) of the additional information. The abscissa axis indicates a frequency fx in the horizontal direction, and the ordinate axis denotes a frequency fy in the vertical direction. The origin point at the center indicates a direct current component, and as the distance from the origin point increase the frequency of the region is higher. A circle in the drawing indicates a cut-off frequency according to error diffusion. Filter characteristics of the error diffusion method indicate characteristics of an HPF (high pass filter) that cuts-off a low frequency region, and the cut-off frequency is changed depending on a density of the target image.

Here, a frequency characteristic that occurs after quantization is changed by changing the quantization threshold. Through changes to the quantization threshold according to FIG. 10A, a large power spectrum occurs on the frequency vector A of FIG. 14. Through changes to the quantization threshold according to FIG. 10B, a large power spectrum occurs on the frequency vector B of FIG. 14. At a time of separation, by detecting a frequency vector for which a large power spectrum occurs, it is possible to determine a multiplexed signal. Accordingly, it is necessary to individually emphasize and to extract each frequency vector.

FIG. 13A and FIG. 13B correspond to HPFs having directionality for a specific frequency vector. In other words, it is possible for the spatial filter A of FIG. 13A to emphasize the frequency vector on a line A. Also, it is possible for the spatial filter B of FIG. 13B to emphasize the frequency vector on a straight line B. For example, it is assumed that through a change to the quantization condition according to FIG. 10A, a large power spectrum occurs on the frequency vector A of FIG. 14. At that point, although the amount of change for the power spectrum is amplified through the spatial filter A of FIG. 13A, it is mostly not amplified through the spatial filter B of FIG. 13B. In other words, when filtering with a plurality of spatial filters in parallel, because amplification only occurs when a frequency vector matches a spatial filter, and there is mostly no amplification for other filters, it is easy to discern that a large power spectrum occurs on a particular frequency vector.

Figure 15:
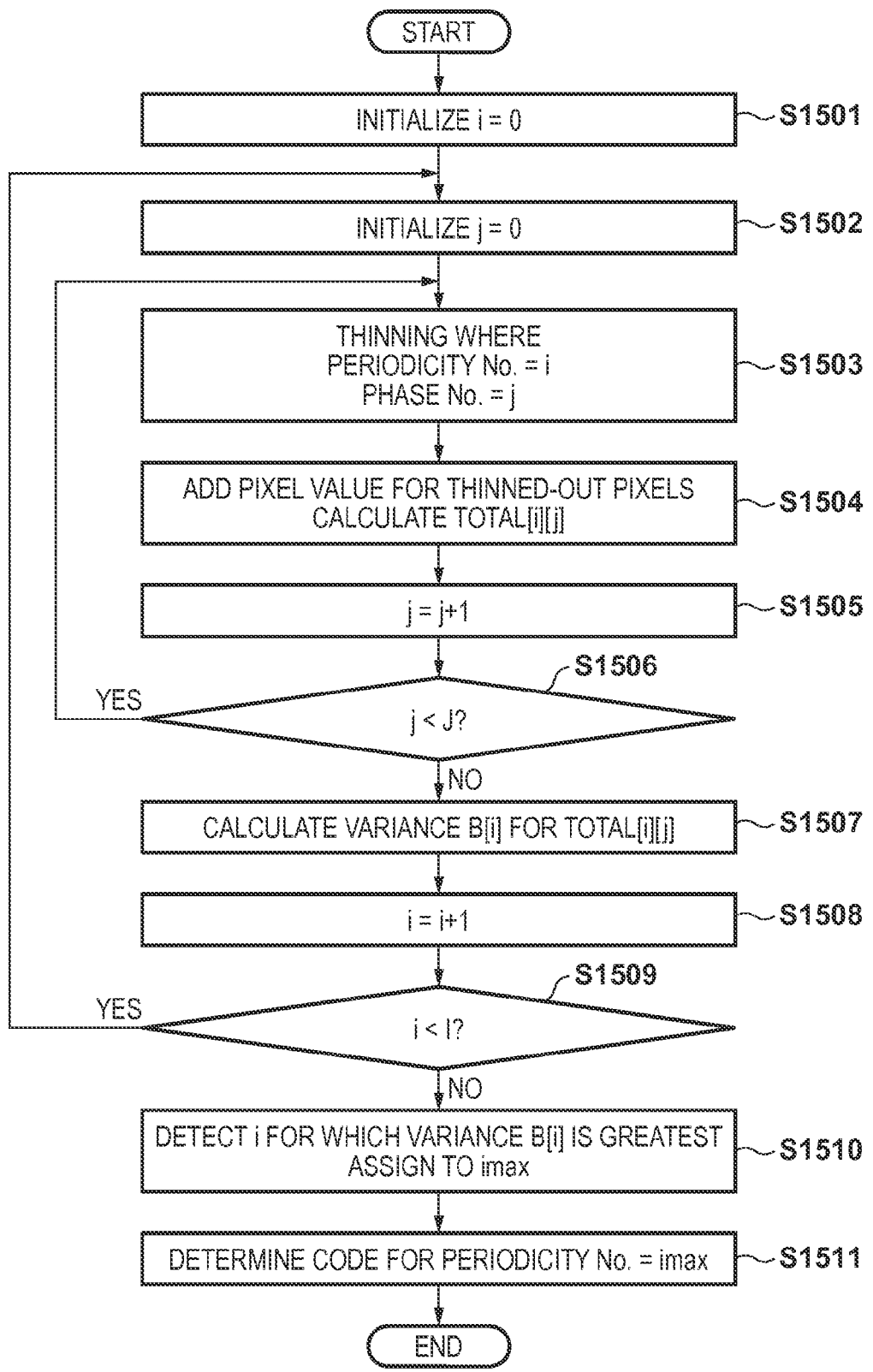
FIG. 15 is a flowchart for illustrating processing executed by the separating apparatus.

FIG. 15 is a flowchart showing processing executed by the separating apparatus 210 of FIG. 11. The processing includes operation of the thinning unit A 1106 and the thinning unit B 1107, the converted value addition units 1108a and 1108b, the variance calculation units 1109a and 1109b, and the determination unit 1110 in the separating apparatus 210. Note that the processing shown in FIG. 15 is realized by the CPU 1121 of the separating apparatus 210 executing a control program stored in the ROM 1122.

In step S1501, the separating apparatus 210 initializes a variable i (i=0). The variable i is a variable related to periodicity. In step S1502, the separating apparatus 210 initializes a variable j (j=0). The variable j is a variable related to phase. In step S1503, the separating apparatus 210 determines factors for the regularity of thinning according to the thinning unit A 1106 and the thinning unit B 1107, in other words, two factors: "periodicity" and "phase". Conditions for the periodicity and phase are managed by a number (No.), and currently factors of the thinning method are set: the periodicity No. is "i", and the phase No. is "j".

In step S1504, the separating apparatus 210 adds up converted values (a pixel value of a thinned pixel) in a block by the converted value addition units 1108a and 1108b, and an add-up value that was added up is stored as an array TOTAL[i][j], which is a variable. In step S1505, the separating apparatus 210 increments the variable j (increments by 1). In step S1506, the separating apparatus 210 compares the variable j and the fixed value J, and determines whether the variable j is less than the fixed value J. Here, the fixed value J indicates a number of times thinning-out processing that changes the phase is executed. As a result of the determination, if the variable j is less than the fixed value J (YES in step S1506), the processing returns to step S1503, a condition for a new phase No. according to an incremented variable j is used to then execute the thinning-out processing and the converted value (thinned pixel value) addition processing.

In contrast, when the variable j is greater than or equal to the fixed value J (NO in step S1506), in other words, in a case when a number of times of setting thinning-out processing and addition processing for a shifted phase (a number of times that the fixed value J indicates) has been completed, in step S1507 the separating apparatus 210 calculates a variance B[i] of TOTAL[i][j], which are the addition results, by using the variance calculation units 1109a and 1109b. In other words, to what extent each addition result varies due to a difference of phase is evaluated. Here, the value of i is fixed, and J variance B[i]s of TOTAL[i][j] are calculated.

In step S1508, the separating apparatus 210 increments variable i (increments by 1). In step S1509, the separating apparatus 210 compares the variable i and the fixed value I, and determines whether the variable i is less than the fixed value I. Here, the fixed value I indicates a number of times thinning-out processing that changes the periodicity is executed. As a result of the determination, if the variable i is less than the fixed value I (YES in step S1509), the processing returns to step S1502, a condition for a new periodicity No. according to an incremented variable i is used to then execute thinning-out processing and the converted value (thinned-out pixel value) addition processing.

In step S1509, when the variable i is greater than or equal to the fixed value I (NO in step S1509), in other words, in a case when a number of times of setting thinning-out processing and addition processing for a shifted periodicity (a number of times indicating the fixed value I) has completed, I variance B[i]s are calculated. In step S1510, the separating apparatus 210 detects a maximum value of the variance values from the collection of I variance B[i]s, and the value of i at that point is assigned to the variable imax. In step S1511, the separating apparatus 210 determines, through the determination unit 1110, that, as a result of determining the encoding, the code for which the periodicity No. is the variable imax is the multiplexed code (additional information), and then terminates.

Figures 16A, 16B:
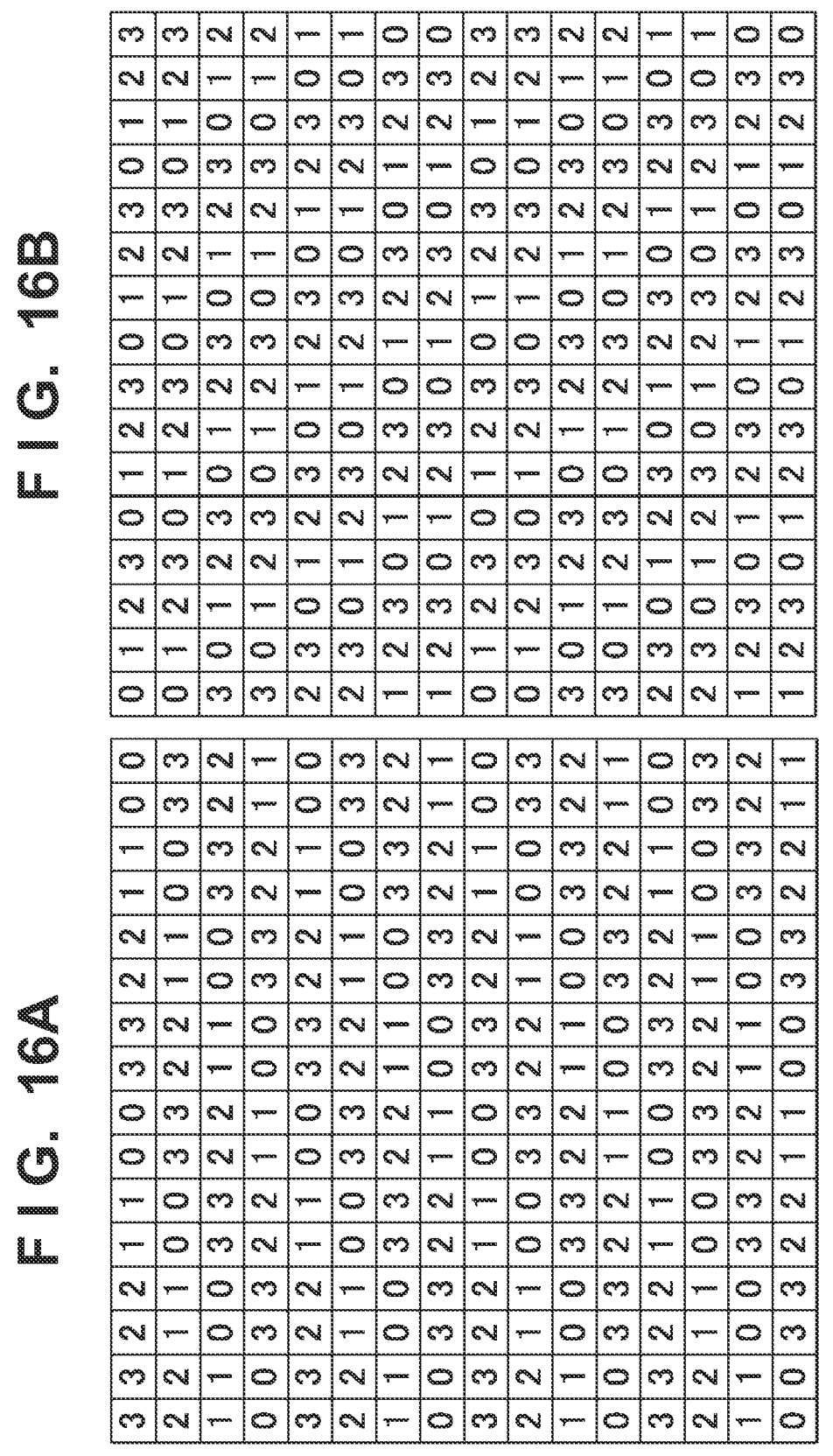

Here, an explanation is given of a processing example for the separating apparatus 210, in which I=2 and J=4. FIG. 16A and FIG. 16B use a table format to indicate a thinning method when the block size is set as P=Q=16. In the drawings, one cell in a block represents one pixel. The block shape in the drawings is a square with P=Q, but the block shape is not limited to a square, and may be other than a rectangle.

FIG. 16A indicates a thinning method when the periodicity No.=0 (corresponding to the thinning unit A 1106 in FIG. 11), and FIG. 16B indicates a thinning method when the periodicity No.=1 (corresponding to the thinning unit B 1107 of FIG. 11). In the drawings, the value shown in each pixel in a block indicates a thinned pixel for j which is the phase No. For example, a pixel displayed as "0" corresponds to a thinned pixel when j=0. In other words, in both FIG.

16A and FIG. 16B, there are four kinds of phase, and these correspond to the thinning method when the phase No. j is 0-3.

The periodicity shown in FIG. 16A and FIG. 16B respectively matches the periodicity of FIG. 10A and FIG. 10B. As with FIG. 10A and FIG. 10B, in the ordering of hatched cells, the quantization value "1" (note that this is the case of two values "0" and "1") is easier to line up. Therefore, for example, in a case of a block that uses the quantization condition A at a time of multiplexing, by the periodicity of FIG. 16A, the quantization value "1" tends to line up. When a spatial filter is adapted, its frequency component is further amplified, and by the periodicity of FIG. 16A, when the converted values (the pixel values after filtering) are added up, the variance of the addition result thereof becomes large.

In comparison, in a case of filtering a block that uses the quantization condition A by using an unadapted spatial filter and also thinning via the periodicity of FIG. 16B, the variance value of the addition result for the converted values becomes small. This is because an add-up value for the converted values due to differences in the thinning phase becomes average, and variation becomes small, as the periodicity of the quantization value differs to the periodicity of thinning. Conversely, for a block that uses the quantization condition B at a time of multiplexing, the variance value decreases with the thinning of FIG. 16A, and the variance value increases with the thinning of FIG. 16B.

In the example of the flowchart of FIG. 8A, because bit=0 is set as the quantization condition A and bit=1 is set as the quantization condition B, it is possible to determine that bit=0 when the variance value of the periodicity No.=0 is large, and conversely, to determine that bit=1 when the variance value of the periodicity No.=1 is large.

In other words, by associating the quantization condition, the spatial filter characteristics, and the periodicity of the thinning conditions, it is possible to realize multiplexing and separation easily. Here, there were two types of the periodicity No.—"0" and "1"—and the multiplexing code in the block was one bit, but the multiplexing code can be set to something greater than this. Here, the type of the quantization condition and the type of the spatial filter, and the type of the periodicity No. of the thinning condition (the value of I) match.

In this fashion, even if comparison of power values for frequencies corresponding to a regularity of a quantization condition according to orthogonal transformation is not performed, it is possible to separate the code easily. Moreover, because this is processing in the real spatial domain, it is possible to realize very high speed separation processing.

Note that the quantization conditions A and B, the spatial filters A and B, and the thinning units A and B are one example, and limitation is not made to this. Other periodicities may be held, and the values of spatial filter tap numbers, the block size for thinning, or the like, can be adjusted in accordance with intended use.

For the processing of FIG. 15, to simplify the explanation, an explanation was given of processing repeatedly (looping) using the variable i that is the periodicity No., and the variable j that is the phase No. Actually, however, it is easier to repeatedly execute processing according to a pixel address in a block comprised of P×Q pixels. In other words, as shown in FIG. 16A and FIG. 16B, this is a method of storing, in advance, as a table, two types of information—the periodicity No. and the phase No—with respect to each pixel address in the block, and then adding up converted values in variables corresponding to each periodicity No. and phase No. Through this method, by just processing a portion for P×Q pixels, it is possible to calculate in parallel an add-up value for each group of the periodicity No. and the phase No.

In addition, through the processing of FIG. 15, the code is determined by calculating a variance of an addition result for pixel values (converted values) after filtering via a spatial filter, and then performing a large/small comparison of the variance values, but the determination is not limited to this. It is also possible to use a method of comparing evaluation functions rather than variance values. For a bias of an addition result for the converted value, because a value tends to protrude at a time for a single phase when a phase is shifted, it is good if a "degree of variation" can be evaluated.

For example, to evaluate the degree of variation, it is possible to use an evaluation function as shown below, rather than the variance value.

1. An evaluation function of calculating a difference between a maximum and minimum of add-up values into which converted values are added up.

2. An evaluation function that calculates, for the add-up values into which the converted values are added up, either a difference between the maximum value and the second largest value, or a difference between the minimum and the second smallest value.

3. An evaluation function that calculates a maximum value for a difference previous/succeeding orders when generating a histogram for add-up values into which converted values are added up.

Although the evaluation functions 1 to 3 concern an absolute difference value, a relative ratio between a difference value and a converted value or the sum total of the pixel values, the converted values, or the like, can also be used as the evaluation function. In addition, an explanation was given of an example of binarizing quantization values, limitation is not made to this.

Next, an explanation is given of a method of multiplexing and separating additional information in the first embodiment, when the hard cover 5012 is selected by the generating apparatus 202 as the option for the bookbinding type 501 shown in FIGS. 5A-5D.

Figure 1C:
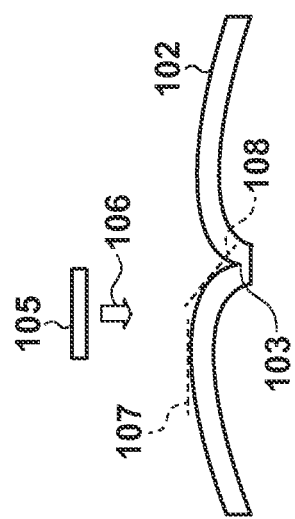

When the non-flat type bookbinding type is selected, the imaged surfaces 107 and 108 are not at a fixed angle with respect to the camera-equipped mobile terminal 105 due to curves of the photo book, which is the printing target item, as shown in FIG. 1C. In other words, through conventional methods, for example, after multiplexing additional information to the printed material shown in FIG. 17A, if the printed material is book-bound by the non-flat type bookbinding type, it becomes as shown in FIG. 17B.

Here, in particular, FIG. 17A shows an example in which there is a printed material printed so as to be greater than or equal to the resolution of the image sensor 209; four photographs are laid-out in a page of a photo book, in which additional information is embedded in the top-right photograph. To facilitate ease of understanding, blocks generated through the quantization condition A and the quantization condition B are arranged alternatingly vertically/horizontally.

FIG. 17B is a photo book that is book-bound by the non-flat type printed material shown in FIG. 17A. In such a case, the shape of the photo book, which is a printing target item for printing of additional information, is curved such that a mountain is formed between the center of the photo book (the gutter portion) and the edge of the paper laterally. If imaging the photo book from the front in this state, although a frequency for a block in a region 1701 is maintained, a frequency for a block in a region 1702 is not maintained. Therefore, even if the spatial filters A and B of the separating apparatus 210 are applied to the region 1702, it is not possible to appropriately perform filtering.

In contrast to this, FIG. 17C and FIG. 17D indicate a state of printed material and a photo book when processing of the first embodiment is applied. For a region 1703 and a region 1704 of FIG. 17C, a multiplexing condition is changed. In other words, when the region 1703 and the region 1704 are compared, a block for the region 1704 is extended horizontally. In this fashion, in accordance with a position on an image at which additional information is embedded, the shape of the region that the position falls under changes to be different than the shape of another region. FIG. 17D is a photo book book-bound through the non-flat type the printed material shown in FIG. 17C. As shown in FIG. 17D, the frequency not maintained for a block in the region 1702 of the photo book in FIG. 17B is maintained in a region 1706. Therefore, when the spatial filters A and B of the separating apparatus 210 are applied to the region 1706, it is possible to appropriately perform filtering and then separating of the additional information.

Figure 18B:
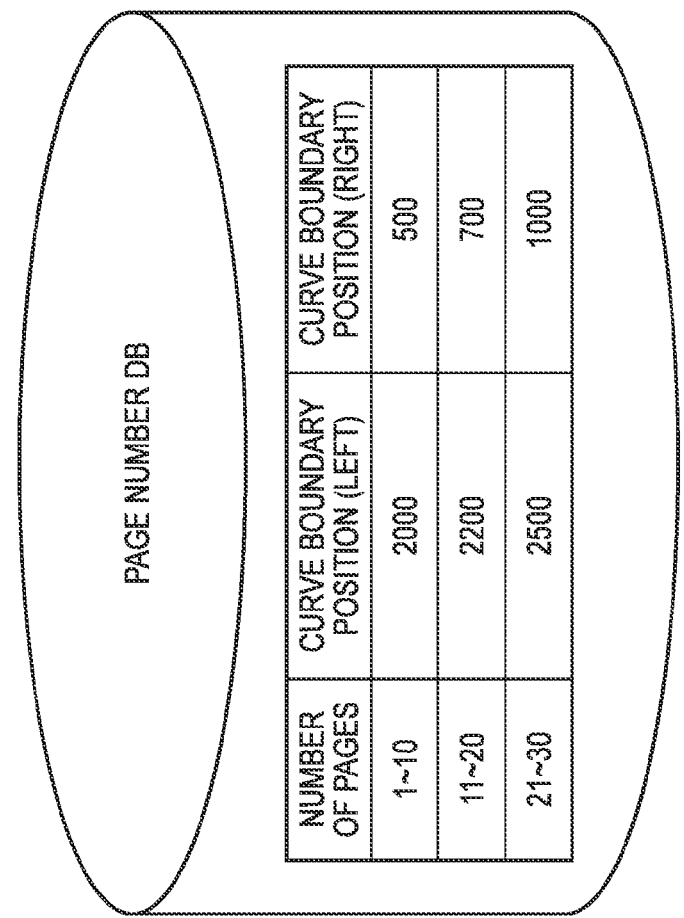
FIGS. 18A and 18B are views showing a bookbinding type database and a curve boundary position database.
Figure 18A:
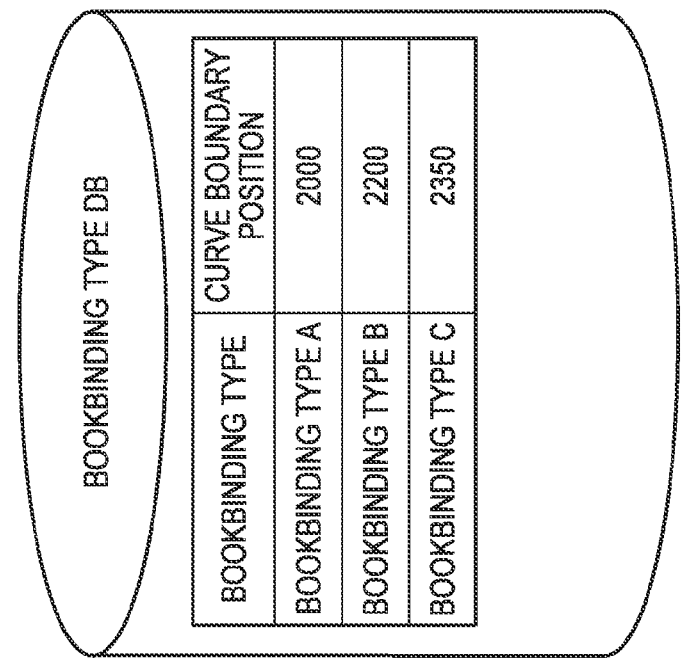

Next, referring to FIG. 8B and FIG. 9B, an explanation is given for the multiplexing apparatus 207 when book-binding by using the non-flat type. Note that, in FIG. 8B, for processing that is the same as that of FIG. 8A, the same step number is added, and a detailed explanation thereof is omitted. As shown in FIG. 9B, a number of horizontal pixels for a block at a boundary for pixels of a curve boundary TJ is N' (N'>N). In other words, the size of an embedding region on the right side on an opposite side of the boundary is larger than the size of an embedding region on the left side of the boundary. A pixel position of the curve boundary TJ is changed for each bookbinding type managed by a bookbinding type DB, as shown in FIG. 18A. A curve boundary position managed by the bookbinding type DB indicates a number of pixels from the left side of an image printed in the printed material of a designated size. Here, it is represented that, compared to the bookbinding type A, a valley fold for the gutter portion is deep when book-binding is performed for the bookbinding type B. The curve boundary position, which is a boundary for which a block frequency cannot be maintained, due to the deep valley fold for the gutter portion, is moved to the left of the image. The bookbinding type DB is, for example, stored in the ROM 612. A method of segmenting an embedding region with respect to an image is changed for each bookbinding type. For example, an embedding region for when the bookbinding type A is set is segmented so as to become as shown in FIG. 9A, and an embedding region for when the bookbinding type B is set is segmented so as to become as shown in FIG. 9B.

In the flowchart of FIG. 8B, the processing of step S801 to step S803 is passed through, and in step S820, the multiplexing apparatus 207 executes curve determining. More specifically, the multiplexing apparatus 207 determines whether the curve boundary position TJ, corresponding to the bookbinding type designated with reference to the bookbinding type DB, is greater than the pixel position j (TJ>j). If the curve boundary position TJ is greater than pixel position j (YES in step S820), thereafter, processing from step S805 is executed, similarly to FIG. 8A. In contrast, if the curve boundary position TJ is less than or equal to the pixel position j (NO in step S820 (TJ<=j)), in step S821, the multiplexing apparatus 207 executes the following processing.

$$\text{bit}=\text{code}\,[\text{INT}(i/M) \times W + \text{INT}((j-TJ)/N') + \text{INT}(TJ/N)] \quad (5)$$

Because information in code[ ] is known for the case in which the curve boundary position TJ is less than or equal to pixel position j, due to the processing of step S821, in step S806a, the multiplexing apparatus 207 determines whether the assigned variable bit is "1" (bit=1). Step S806a corresponds to step S806. As a result of the determination, when the variable bit is "0" (NO in step S806a), the multiplexing apparatus 207 sets the quantization condition A' in step S822. However, when the variable bit is "1" (YES in step S806a), in step S823 the multiplexing apparatus 207 sets the quantization condition B'. Through the processing of step S822 or step S823, quantization is performed for a case in which there are N' horizontal pixels in a block. With the quantization conditions A and B, a period of variation of the quantization threshold of FIG. 10A and FIG. 10B is used, but with the quantization conditions A' and B', a period of variation of the quantization threshold of FIG. 10C and FIG. 10D is used. For processing thereafter, similarly to FIG. 8A, processing of step S809 or later is executed.

In addition, regarding a scheme of directly multiplexing a periodicity for RGB luminance information, as explained through FIG. 8C, by processing after interpreting the quantization condition A' and the quantization condition B' as the multiplexing period A' and the multiplexing period B', it is possible to apply a multiplexing period to the RGB data.

By executing the processing shown in FIG. 8B, it is possible to change a number of horizontal pixels for a block for the left and the right of the curve boundary position TJ, as shown in FIG. 9B. A non-flat type photo book book-bound after generating printed material that uses an image obtained through this processing is as shown by FIG. 17D, and separating the additional information by using the separating apparatus 210 that is similar to a conventional one is possible.

As explained above, by the first embodiment, it is possible to read the additional information irrespective of the angle between a camera and an object (photograph). As a consequence, even with a photo book bound by a bookbinding method other than flat bookbinding—in particular, a bookbinding method for which a valley fold can occur in a gutter portion—it is possible to generate and to separate the additional information without being affected by the valley fold of the gutter portion.

Note that, for the embodiments described above, the multiplexing condition was changed for each bookbinding type, but the multiplexing condition may be changed in response to a number of pages. In other words, because a curve for a photo book changes in accordance with a number of pages, the curve boundary position TJ changes in response to the number of pages. Accordingly, as shown in FIG. 18B, it is possible to use a page number DB that sets a curve boundary position in accordance with the number of pages. The page number DB, similarly to the bookbinding type DB, is, for example, stored in the ROM 612. The page number DB sets a pixel for the curve boundary position in accordance with the number of pages and whether on the left or the right of a double-page spread. If the photo book opens to the left, there is a large curve on the left side of the double-page spread for pages at the start, and there is a large curve on right-side of the double-page spread for pages at the end. Accordingly, considering such characteristics, a number of pixels for the curve boundary position is set in the page number DB in accordance with the page number, and it is possible to execute curve determination in accordance with the page number.

For the above described embodiment, although one curve boundary position is set, limitation is not made to this, and it is possible to set a plurality of curve boundary positions. It is also possible to change the block horizontal pixel N in accordance with an approach to the gutter portion without setting the curve boundary position. In addition to the block horizontal pixel N, it is also possible to change the block vertical pixel M.

It is also possible to generate the photo book by bookbinding printed material itself generated by the first embodiment. It is also possible to generate a photo book by pasting printed material generated by the first embodiment to a page of the photo book, which is generated by book-binding plain printed material.

Second Embodiment

Figure 19A:
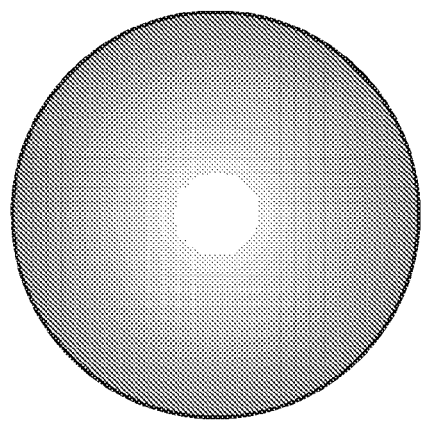
FIGS. 19A to 19D are views for illustrating examples of reading additional information.
Figure 19B:
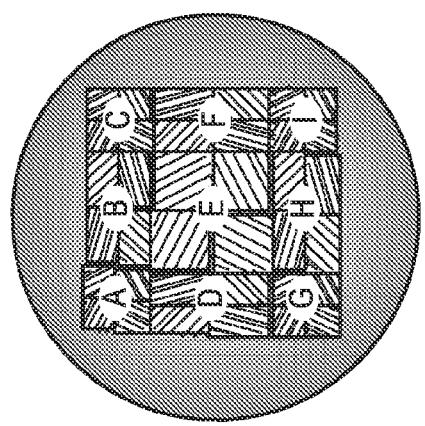

For a second embodiment, an explanation is given of a case in which additional information is multiplexed to a sphere, such as a globe, as shown in FIG. 19A. In a case in which thirty-six (six vertical×six horizontal) multiplexing blocks, for which horizontal pixels N and vertical pixels M are the all the same pixels, are arranged and printed on a sphere, the image of the sphere captured from one direction is as shown by FIG. 19B. If FIG. 19B is divided into regions A-I, each having four blocks, capturing is performed with the region E as a reference, reducing the region B and the region H vertically, reducing the region D and the region F horizontally, and reducing the regions A, C, G, and I vertically and horizontally.

Figure 19C:
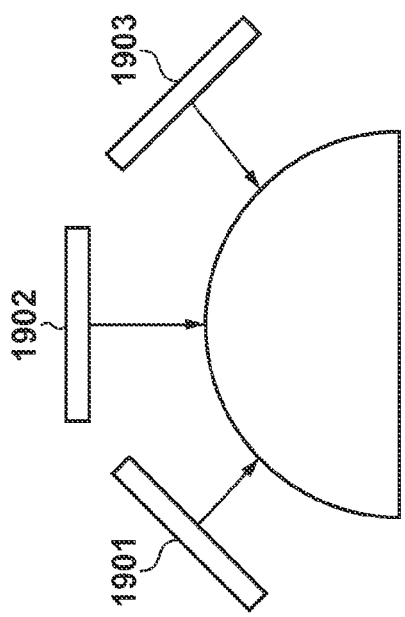

Regarding a captured image for FIG. 19B, other than for the region E, additional information cannot be separated. In a case of separating additional information for regions of FIG. 19B other than the region E, it is necessary to capture, after tilting, the camera in each direction (nine directions). FIG. 19C is a view for illustrating an example of a captured image when capturing is performed after the camera is tilted. FIG. 19C represents a cross-sectional view when dividing along a line connecting the regions D, E, and F of FIG. 19B, and the reference numerals 1902, 1903, and 1904 each denote the camera. In other words, it is necessary to capture the region E by the camera 1902, and capture the region D and the region F by tilting the position of the camera to the camera 1901 and the camera 1903, respectively. Similarly, because it is necessary to tilt in the direction of the region B and the region H, the region A and the region I, as well as the region C and the region G, there are cases in which it is necessary to capture a maximum of nine times.

Figure 19D:
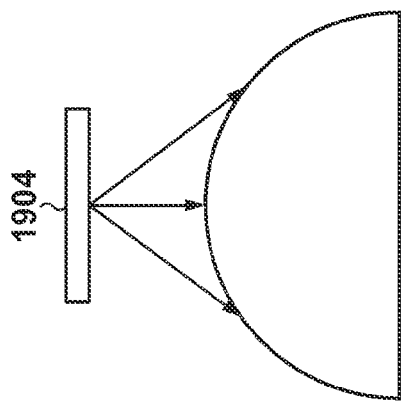

Accordingly, when applying the multiplexing process in FIG. 8B, it is possible to print by extending the regions of the multiplexing blocks: the region B and the region H vertically, the region D and the region F horizontally, and the regions A, C, G, and I vertically and horizontally, in accordance with the tilting in FIG. 19B. As a result, as shown in FIG. 19D, by capturing once through the camera 1904, separating the additional information for each of the regions A-I is possible.

As explained above, by the second embodiment, irrespective of an angle between an image capturing apparatus and an object (a photograph), it is possible to efficiently read additional information printed after being multiplexed on a three-dimensional shape such as a sphere, and it is possible to separate the additional information with a single capturing.

Third Embodiment

For a third embodiment, explanation is given of a case in which the camera-equipped mobile terminal 105 that separates the additional information is installed on a fixed base, as shown in FIGS. 20A and 20B. In FIG. 20A, the camera-equipped mobile terminal 105 is mounted on a base 2001 fixed on a column 2002. This is used to prevent camera-shake blur of the camera-equipped mobile terminal 105 when separating the additional information. In other words, in separating the additional information from a photo book 2003, when the camera-equipped mobile terminal 105 is held by hand in the capturing, camera-shake blur occurs. Due to camera-shake blur occurring, an image captured by the camera-equipped mobile terminal 105 is blurred, and separating the additional information becomes impossible. By fixing the camera-equipped mobile terminal 105 to the base 2001, camera-shake blur is prevented. Furthermore, because the camera-equipped mobile terminal 105 is operated while being fixed to the base 2001, to facilitate operation, the camera-equipped mobile terminal 105 is fixed to be tilted with respect to the horizontal plane (the printing surface for the printed material).

FIG. 20B is a view of the relation between the camera-equipped mobile terminal 105 and the photo book 2003 of FIG. 20A viewed from the perspective of a side. Supposing that the photo book 2003 is printed after additional information is multiplexed over the full area of the pages thereof, a distance 2005 between upper portions of the camera-equipped mobile terminal 105 and the photo book 2003 is longer than a distance 2004 between lower portions of the camera-equipped mobile terminal 105 and the photo book 2003. The difference in distance is large compared to a case of capturing after making the camera-equipped mobile terminal 105 horizontal with respect to the photo book 2003. Accordingly, an image captured in a state of FIG. 20B is like that of FIG. 12B. A captured image for which distance from the camera-equipped mobile terminal 105 is close to the distance 2005 that is further than the distance 2004, becomes smaller than a captured image for which the distance from the camera-equipped mobile terminal 105 is close to the distance 2004. In other words, for an imaging region close to the distance 2005, the additional information cannot be separated.

Accordingly, by applying the multiplexing process in FIG. 8B, the shape of a multiplexing block is extended vertically and horizontally for an imaging region close to the distance 2005, and the shape of a multiplexing block for an imaging region close to distance 2004 does not change. In this fashion, separating additional information is possible, even in an imaging region close to the distance 2005, for which the additional information cannot be separated conventionally.

Figure 21A:
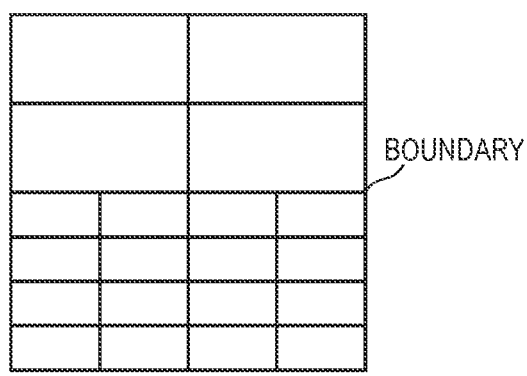
FIGS. 21A to 21C are views for explaining a method for a division of an embedding region.
Figure 21B:
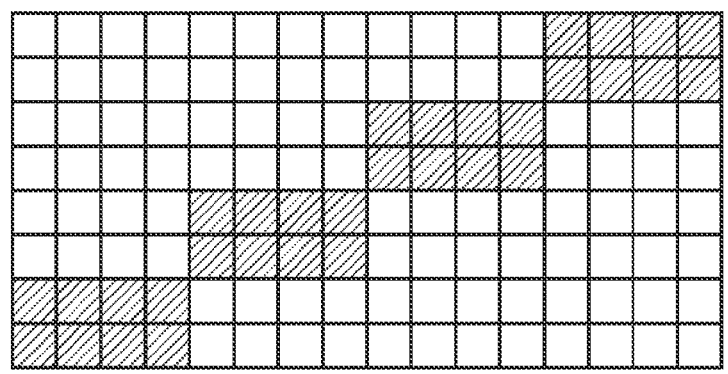
Figure 21C:
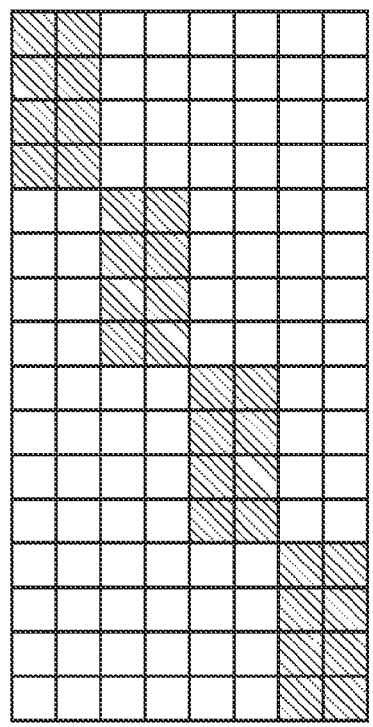

Note that, a method of segmenting an embedding region with respect to an image is also changed based on the distance between the image capturing apparatus and the object. For example, if a distance between the object and the image capturing apparatus input by the user is as shown in FIG. 20B, the embedding region is segmented as shown in FIG. 21A. For an embedding region on a bottom side of a boundary, for example, FIGS. 10A and 10B are used as quantization conditions, and for an embedding region on a top side of the boundary, FIGS. 21B and 21C are used.

As explained above, by the third embodiment, by multiplexing the additional information after considering the capturing angle between the image capturing apparatus and the object (photograph), separating the additional information from the object efficiently and with good precision is possible irrespective of the capturing angle between the image capturing apparatus and the object (photograph).

Fourth Embodiment

In accordance with intended use, an embodiment arbitrarily combining the first through third embodiments described above is also possible. For example, it is possible to arbitrarily combine and to use embedding conditions for embedding the additional information. For example, after designating the bookbinding type and number of pages in FIGS. 18A and 18B, it is possible to use as an embedding condition a capturing angle between an imaged surface, for which an image of the printed material was captured, and the image capture apparatus, defined through the designated number of pages and bookbinding type. Furthermore, in addition to the bookbinding type and number of pages, after designating a position in a page at which to arrange an image in which additional information is embedded, it is possible to use, as an embedding condition, a capturing angle between an imaged surface, for which an image of the printed material was captured, and the image capture apparatus, defined through the designated bookbinding type, number of pages and position. Furthermore, in addition to these, the embedding conditions, as in the third embodiment, it is also possible to use an embedding condition that adds either a capturing distance or a capturing angle of the image capture apparatus with respect to a printing surface for the printed material.

In this fashion, for the embodiments described above, an image capturing condition (multiplexing condition) relating to the image capture apparatus is input as an embedding condition, and in accordance with the image capturing condition, the additional information is embedded after segmenting an embedding region into a plurality of regions, and an image in which additional information is embedded is generated. Here, the image capturing condition can also be said to be an embedding condition that defines a shape of a region to which additional information is embedded.

Here, in the case of the first embodiment, the image capturing condition corresponds to a capturing angle between an imaged surface and the image capture apparatus, defined according to the bookbinding type and the number of pages at the time of bookbinding. Here, in the case of the second embodiment, the image capturing condition corresponds to a capturing angle between an imaged surface and the image capture apparatus, defined according to the shape of a three-dimensional object to which the printed material is affixed. Furthermore, in the case of the third embodiment, the image capturing condition corresponds to either a capturing distance or a capturing angle between the image capture apparatus and the imaged surface.

Here, the imaged surface corresponds to a partial region of an overall region of an object that is a subject to be imaged, and the imaged surface is segmented according to a resolution of the image capture apparatus (image sensor). The multiplexing apparatus 207 controls (determines) a shape (size) of a region (embedding region) in which the additional information is embedded depending on whether the capturing angle is within a predetermined range for each partial region.

More specifically, regarding an embedding region corresponding to an imaged surface for which the capturing angle is within the predetermined range, a setting is made for an embedding region of a predetermined size, and regarding an embedding region corresponding to an imaged surface for which the capturing angle is not within the predetermined range, a setting is made for an embedding region whose size is greater than the embedding region of the predetermined size. In particular, when the shape of an embedding region is rectangular, regarding an embedding region that corresponds to an imaged surface for which the capturing angle is not within the predetermined range, at least one of a horizontal or a vertical extension is performed.

By controlling the shape of the embedding region in this fashion, it is possible to extract (separate), with good precision, additional information embedded in an object, irrespective of an angle between the image capture apparatus and the imaged surface for the object.

In addition, in the third embodiment, a configuration in which additional information is separated from printed material, in which an image, in which additional information is embedded, is printed, but limitation is not made to this. For example, when displaying the image on a display apparatus, separating additional information with good precision is possible even in a case of reading additional information after tilting the image capture apparatus with respect to display surface of the display apparatus, similar to in the third embodiment.

Other Embodiments

Embodiment(s) of the present invention can also be realized by a computer of a system or an apparatus that reads out and executes computer executable instructions (e.g., one or more programs) recorded on a storage medium (which may also be referred to more fully as a non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU) or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. An image processing apparatus for embedding additional information in an image having a plurality of pixels and image information, the apparatus comprising:
   a generating unit that generates (a) the additional information to be embedded and (b) a bookbinding type of a medium containing the image, the bookbinding type relating to a binding of the medium;
   a holding unit that holds a plurality of quantization conditions for embedding the additional information, the plurality of quantization conditions including a quantization threshold;

a selection unit that segments the image into a plurality of embedding regions, and selects a condition to use in quantization from the plurality of quantization conditions based on the image information, wherein the image information corresponds to (a) an embedding region to be processed and (b) a position of the embedding region to be processed;

a quantization condition control unit that controls at least one of the plurality of quantization conditions for a predetermined region of the image based on the bookbinding type generated by the generating unit;

an error diffusion processing unit that (a) adds, to a target pixel value, a first quantization error value, (b) compares the quantization threshold and the first quantization error value, (c) produces a second quantization result value, (d) calculates an error between the quantization error value and the second quantization result value, and (e) distributes the error to peripheral pixels of the target pixel; and a separating unit that separates the embedded additional information from the image.

2. The image processing apparatus according to claim 1, wherein the embedding region is a rectangle and a size of the embedding region is determined by a shape of a printed material set by a user, and a size of the plurality of embedding regions differs based on a predetermined boundary position.

3. The image processing apparatus according to claim 1, wherein a size of (i) an embedding region arranged in a predetermined direction with respect to a boundary position of a printed material specified in accordance with a shape of a printed material set by a user is smaller than a size of (ii) an embedding region arranged in a direction opposite to the predetermined direction.

4. The image processing apparatus according to claim 1, wherein a size of (i) an embedding region arranged in a predetermined direction with respect to a boundary position of a printed material specified in accordance with a number of pages of a printed material set by a user is smaller than a size of (ii) an embedding region arranged in a direction opposite to the predetermined direction.

5. An image processing method for embedding additional information in an image having a plurality of pixels and image information, the method comprising:

generating (a) the additional information to be embedded and (b) a bookbinding type of a medium containing the image, the bookbinding type relating to a binding of the medium;

holding a plurality of quantization conditions for embedding the additional information, the plurality of quantization conditions including a quantization threshold;

segmenting the image into a plurality of embedding regions;

selecting a condition to use in quantization from the plurality of quantization conditions based on the image information, wherein the image information corresponds to (a) an embedding region to be processed and (b) a position of the embedding region to be processed;

controlling the one of the plurality of quantization conditions, selected in the selecting, for a predetermined region of the image based on the bookbinding type generated;

executing processing on the image by (a) adding, to a target pixel value, a first quantization error value, (b) comparing the quantization threshold and the first quantization error value, (c) producing a second quantization result value, (d) calculating an error between the quantization error value and the second quantization result value, and (e) distributing the error to peripheral pixels of the target pixel; and separating the embedded additional information from the image.

6. The image processing method according to claim 5, wherein the embedding region is a rectangle and a size of the embedding region is determined by a shape of a printed material set by a user, and a size of the plurality of embedding regions differs based on a predetermined boundary position.

7. The image processing method according to claim 5, wherein a size of (i) an embedding region arranged in a predetermined direction with respect to a boundary position of a printed material specified in accordance with a shape of a printed material set by a user is smaller than a size of (ii) an embedding region arranged in a direction opposite to the predetermined direction.

8. The image processing method according to claim 5, wherein a size of (i) an embedding region arranged in a predetermined direction with respect to a boundary position of a printed material specified in accordance with a number of pages of a printed material set by a user is smaller than a size of (ii) an embedding region arranged in a direction opposite to the predetermined direction.

9. A non-transitory computer-readable storage medium storing a program for causing a computer to perform image processing to embed additional information in an image having a plurality of pixels and image information, wherein the computer program causes the computer, which holds a plurality of quantization conditions for embedding the additional information, the plurality of quantization conditions including a quantization threshold, to function as:

a generating unit that generates (a) the additional information to be embedded and (b) a bookbinding type of a medium containing the image, the bookbinding type relating to a binding of the medium;

a selection unit that segments the image into a plurality of embedding regions, and selects a condition to use in quantization from the plurality of quantization conditions based on the image information, wherein the image information corresponds to (a) an embedding region to be processed and (b) a position of the embedding region to be processed;

a quantization condition control unit that controls the one of the plurality of quantization conditions, selected by the section unit, for a predetermined region of the image based on the bookbinding type generated by the generating unit;

an error diffusion processing unit that (a) adds, to a target pixel value, a first quantization error value, (b) compares the quantization threshold and the first quantization error value, (c) produces a second quantization result value, (d) calculates an error between the quantization error value and the second quantization result value, and (e) distributes the error to peripheral pixels of the target pixel; and a separating unit that separates the embedded additional information from the image.

10. The non-transitory computer-readable storage medium according to claim 9, wherein the embedding region is a rectangle and a size of the embedding region is determined by a shape of a printed material set by a user, and a size of the plurality of embedding regions differs based on a predetermined boundary position.

11. The non-transitory computer-readable storage medium according to claim 9, wherein a size of (i) an embedding region arranged in a predetermined direction with respect to a boundary position of a printed material specified in accordance with a shape of a printed material set by a user is smaller than a size of (ii) an embedding region arranged in a direction opposite to the predetermined direction.

12. The non-transitory computer-readable storage medium according to claim 9, wherein a size of (i) an embedding region arranged in a predetermined direction with respect to a boundary position of a printed material specified in accordance with a number of pages of a printed material set by a user is smaller than a size of (ii) an embedding region arranged in a direction opposite to the predetermined direction.

13. An image processing apparatus for embedding additional information in an image having a plurality of pixels and image information, the apparatus comprising:
  a generating unit that generates (a) the additional information to be embedded and (b) a bookbinding type of a medium containing the image, the bookbinding type relating to a binding of the medium;
  a holding unit that holds a plurality of multiplexing periods for embedding the additional information;
  a selection unit that segments the image into a plurality of embedding regions, and selects a multiplexing period to be multiplexed to the image from the plurality of multiplexing periods, based on the image information, wherein the image information corresponds to (a) an embedding region to be processed and (b) a position of the embedding region to be processed;
  a control unit that controls the multiplexing period, selected by the section unit, for a predetermined region of the image based on the bookbinding type generated by the generating unit;
  a multiplexing unit that executes processing on the image using a filter based on the multiplexing period selected by the section unit; and
  a separating unit that separates the embedded additional information from the image.

14. An image processing method for embedding additional information in an image having a plurality of pixels and image information, the method comprising:
  generating (a) the additional information to be embedded and (b) a bookbinding type of a medium containing the image, the bookbinding type relating to a binding of the medium;
  holding a plurality of multiplexing periods for embedding the additional information;
  segmenting the image into a plurality of embedding regions;
  selecting a multiplexing period to be multiplexed to the image from the plurality of multiplexing periods, based on information of the image that corresponds to an embedding region to be processed and a position of the embedding region to be processed;
  controlling the multiplexing period, selected in the selecting step, for a predetermined region of the image based on the bookbinding type generated;
  executing processing on the image using a filter based on the multiplexing period selected in the section step; and
  separating the embedded additional information from the image.

15. A non-transitory computer-readable storage medium storing a program for causing a computer to perform image processing to embed additional information in an image having a plurality of pixels and image information, wherein the computer program causes the computer, which holds a plurality of multiplexing periods for embedding the additional information, to function as:
  a generating unit that generates (a) the additional information to be embedded and (b) a bookbinding type of a medium containing the image, the bookbinding type relating to a binding of the medium;
  a selection unit that segments the image into a plurality of embedding regions, and selects a multiplexing period to be multiplexed to the image from the plurality of multiplexing periods, based on the image information, wherein the image information corresponds to (a) an embedding region to be processed and (b) a position of the embedding region to be processed;
  a control unit that controls the multiplexing period, selected by the section unit, for a predetermined region of the image based on the bookbinding type generated by the generating unit;
  a multiplexing unit that executes processing on the image using a filter based on the multiplexing period selected by the section unit; and
  a separating unit that separates the embedded additional information from the image.

16. An image processing method performed by an image processing apparatus for embedding additional information, the method comprising:
  selecting a layout type from a layout type group including a flat type in which a gutter portion becomes flat when a book is opened and a non-flat type in which a gutter portion does not becomes flat when a book is opened;
  segmenting a multiplexing region in an image into a plurality of embedding regions such that sizes of the embedding regions become the same if the flat type is selected as the layout type; and
  segmenting a multiplexing region in an image into a plurality of embedding regions such that a size of the embedding region in a gutter portion side of a book becomes larger than a size of the embedding region in a side different from the gutter portion side of the book if the non-flat type is selected as the layout type,
  wherein the additional information is embedded in the embedding region.

17. The method according to claim 16, wherein, if the non-flat type is selected as the layout type, the multiplexing region in the image is segmented into the plurality of embedding regions such that the size of the embedding region becomes larger in accordance with an approach to the gutter portion of the book.

18. The method according to claim 16, the method further comprising setting a position of a curve boundary corresponding to the non-flat type if the non-flat type is selected as the layout type,
  wherein, if the non-flat type is selected as the layout type, the multiplexing region in the image is segmented into the plurality of embedding regions such that the size of the embedding region arranged between the position of the curve boundary and the gutter portion becomes larger than the size of the embedding region arranged between the position of the curve boundary and the side different from the gutter portion side of the book.

19. The method according to claim 18, wherein the position of the curve boundary changes in accordance with the number of pages of the book.

20. The method according to claim 18, wherein the additional information includes audio information, moving image information, text document information, copyright information, image capturing date/time information, capturing location information, and photographer information.

* * * * *